United States Patent [19]
Izosimov et al.

[11] Patent Number: 4,499,413
[45] Date of Patent: Feb. 12, 1985

[54] METHOD AND APPARATUS FOR THE CONTROL OF SYNCHRONOUS MOTORS

[75] Inventors: Dimitrij B. Izosimov, Ulica Profsojuznaja; Asif Sabanovic, Sarajevo, both of Yugoslavia

[73] Assignees: Energoinvest; IAT, both of Yugoslavia and U.S.S.R.

[21] Appl. No.: 210,617

[22] Filed: Nov. 26, 1980

Related U.S. Application Data

[63] Continuation of Ser. No. 903,208, May 5, 1978, abandoned.

[30] Foreign Application Priority Data

May 6, 1977 [YU] Yugoslavia ............................ 1155/77

[51] Int. Cl.$^3$ ............................................... H02P 7/26
[52] U.S. Cl. ..................................... 318/802; 318/807; 318/812
[58] Field of Search ................ 318/798, 803, 807, 812

[56] References Cited

U.S. PATENT DOCUMENTS

| | | | |
|---|---|---|---|
| 3,512,067 | 5/1970 | Landau | 318/803 |
| 3,593,083 | 7/1971 | Blaschke | 318/803 |
| 3,805,135 | 4/1974 | Blaschke | 318/803 |
| 3,824,437 | 7/1974 | Blaschke | 318/803 |
| 4,023,083 | 5/1977 | Plunkett | 318/802 |
| 4,041,361 | 8/1977 | Cornell | 318/802 |

Primary Examiner—G. Z. Rubinson
Assistant Examiner—Richard M. Moose

[57] ABSTRACT

A method and apparatus of variable structure for controlling asynchronous motors. More particularly, methods and apparatus for control of flux, torque, angular acceleration, angular velocity, and/or angular position of the rotor of an asynchronous motor, supplied through a converter having switched elements.

12 Claims, 39 Drawing Figures

$$W_2 = \frac{W_0 - W_1}{Jp} = \frac{p^m P(p)}{Q(p)}$$

METHOD AND APPARATUS FOR THE CONTROL OF SYNCHRONOUS MOTORS

This is a continuation, of application Ser. No. 903,208, filed May 5, 1978 now abandoned.

BACKGROUND OF THE INVENTION

This invention covers a method and apparatus of variable structure for controlling asynchronous motors. More particularly the invention teaches methods and apparatus for control of flux, torque, angular acceleration, angular velocity, and/or angular position of the rotor of an asynchronous machine supplied through a converter having switching elements. The method and apparatus are based upon variable structure control systems, and especially upon introducing sliding mode in the systems with discrete type control signal. Introduction of the sliding mode into the control system operation, for the asynchronous machine fed through a converter containing switching elements, is natural because the converter output voltage contains discontinuities that represent control actions to the induction machine. At the same time, such a concept makes possible incorporating a series of new and useful qualities, into the control system.

Prior art control systems have had a magnetic flux regulator, and a torque regulator, which changed the amplitude and frequency of the output voltage, or of the asynchronous motor's supply current, and consequently changed the amplitude and frequency of the stator current of the motor (see Abraham Ludvig, Vehrfahren zur Steurung des von ainer Asynchronmaschine abgegebenan Drehmoments/Licentia-Patent-Verwaltungs kl 21 224/02 HO2 p 7/42 No. 15 65 223). The magnetic flux controller has been a PI type controller, and it affected that component of the stator current which was orthogonal to the direction of magnetic flux of the asynchronous machine's rotor.

The control of the angular velocity of the rotor has been possible in an indirect way, by means of a PI type speed controller, which affected the input of PI type torque controller. The input signal to the speed controller was the difference between the set point value and the measured value obtained using transducer. When voltage inverters were used, the function generators were employed for computing the set point effective value of continuous output voltage of the invertor, the generators being adjusted according to the parameters of the asynchronous motor.

The known methods and systems for controlling, described in U.S. Pat. No. 3,824,437 to Felix Blaschke "Method for Controlling Asynchronous Machines", discuss the set point control of orthogonal projections of the current vectors in the system of coordinates oriented in the direction of rotor flux vector, which determine the modulus of the rotor flux vector torque, and velocity of rotation of the rotor. Magnetic flux transducers (Hall's generators) were used in that system for measuring the vector of the rotor flux, which requires employing a special motor with built-in transducers. Besides, this type of controllers of magnetic flux, torque, and velocity of rotation of the rotor, does not permit a direct regulation of angular position, velocity and acceleration of the rotor, and does not permit improving the dynamic processes of the control system.

The known methods of computing orthogonal projections of the rotor flux and velocity of rotation vectors (see Swiss patent Felix Blaschke: Einrichtung zur Istwertbildung für die Regelung einer Drehstromasynchronmaschine" Holp 5/40 No.472146) are based on applying dynamic models of the stator and rotor circuit of asynchronous machine which operate on the basis of measured electric values that correspond to the voltage and currents of asynchronous machine.

SUMMARY OF THE INVENTION

The main purpose of this invention is to provide a new method and apparatus for controlling asynchronous machines supplied through a converter with switching elements.

Another objective of the invention is to propose a new method and devices for control of asynchronous machines whick make possible a fast and independent control of magnetic flux, torque, or angular acceleration, angular velocity, and angular position of the machine's rotor.

Another objective of the invention is to propose a new method and devices for control of asynchronous machines which make possible realization of direct control of angular acceleration, angular velocity, and angular position of the machine's rotor.

Another objective of the invention is to propose a new method and devices for control of asynchronous machines which enable avoiding statical and dynamical errors in control.

Another objective of the invention is to propose a new method and devices for control of asynchronous machines making possible achievement of a complete reproduction of the set point values of torque, or angular acceleration, velocity, position of the machine's rotor, and magnetic flux as well.

Another objective of the invention is to propose a new method and devices for control of asynchronous machines which enable achieving the invariance of the characteristics of the control system in relation to the parametars of asynchronous machine and the converter which supplies it.

Another objective of the invention is to propose a new method and device for control of asynchronous machines which enable excluding tensometric and mechanical transducers, and magnetic flux transducers.

Another objective of the invention is to suggest a new method and devices for control of the converter containing switching elements which supplies the asynchronous machines.

Another objective of the invention is to propose a new method and devices for control of the converter with switching elements which supplies asynchronous machine, and the switching elements make possible reducing power losses in the converter and asynchronous machine.

Another purpose of the invention is to suggest a method and devices for effective and reliable control of asynchronous machines which are supplied through converters having switching elements.

The achievement of enumerated objectives is based on applying the variable structure control systems. The motion of such systems is described by differential equations with discontinuous right hand sides; the discontinuties can take place on a set of surfaces in state space. The set of possible continuous right hand parts is the set of possible system structures, while the surfaces of discontinuous right hand parts are the surfaces of structure switchover(sliding surfaces).

The theory of variable structure control systems analyses the possible motions in such systems, sets the conditions of existence of motion along the structure switchover surface, or at the intersection of a few surfaces, of the so called sliding mode which has new qualities that none of the structures has, and sets the equations and characteristics of motion in sliding mode. The state space in which the system is described, can be, in a special case, the space of the coordinates of the signal of error of the controls system, and its derivatives, or the space of physical coordinates of the control system, e.g. of the corresponding voltages and currents, while the discontinuties at the right hand sides of differential equations can be a consequence of the switching character of the control signal.

A synthesis of the system for the control of asynchronous machines based on the theory of variable structure control systems, enables giving the system new characteristics which no other system has, and besides it is natural because of the existence of switching signals in the converter with switching elements, which represents the supply system for the induction machine.

Conformably with the invention, the method for the control of asynchronous machines supplied through converter, is realised by selecting the control signal from the set of two possible continuous values, depending on the sign of linear combination of the difference between the measured and set value of angular acceleration, angular velocity, and angular position of asynchronous machine's rotor, or on the sign of the difference between the measured and set value of the torque and the sign of the linear combination of the measured and set value of asynchronous machine's rotor flux and their time derivatives. When certain conditions are fulfilled the foresaid linear combinations become equal to zero (sliding mode), which makes possible keeping the torque, or angular acceleration, velocity and postion, and rotor flux of asynchronous machine at the set level. Time change of measured values of the torque, or angular acceleration, velocity and position, and rotor flux after establishing the sliding mode, does not depend on the parameters of the asynchronous machine and the converter supplying it, but is completely determined by the coefficients of the mentioned linear combinations, and by time change of the correponding set values.

Conformably with the invention, one method for the control of asynchronous machines is realised by selecting the voltage of each converter's phase from the set of two possible values so that the signs of linear combination mentioned, are opposite to the signs of linear combinations themselves.

The other method is realised through selecting such a condition of converter's switching elements in each moment of time, that the signs of time derivatives of asynchronous machine's stator current's components in coordinate system oriented in the sense of asynchronous machine's rotor flux, are determined by the signs of the mentioned linear combinations. When doing that, the values of derivatives of stator currents' components are selected from the set of two possible values for each component, to secure that the signs of the mentioned linear combinations, and time derivatives of stator currents are opposite.

BRIEF DESCRIPTION OF THE DRAWINGS

The invention and its improvements will be more fully described below, with reference to corresponding figures wherein.

For comfortable reading, the numbers of blocks which are represented in the enumerated figures, remain the same throughout the text; the numeration of inputs and outputs of the blocks, and letter indication of the signals are consistent as well.

DESCRIPTION OF THE PREFERRED EMBODIMENTS

Figure 1:
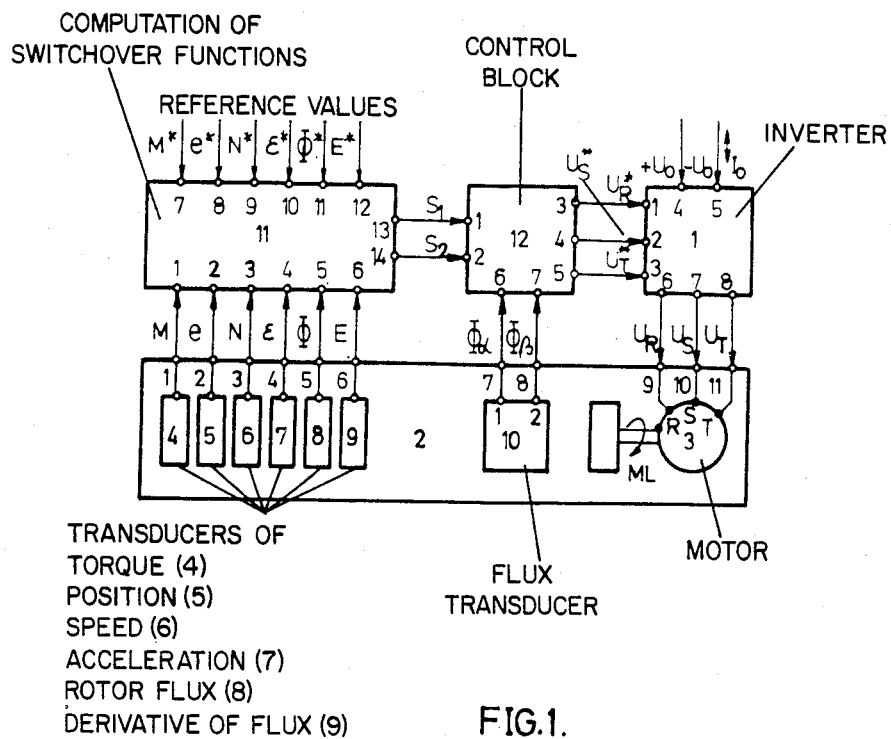
FIG. 1—a block-diagram of a preferred embodiment of the control system.

FIG. 1 represents a block-diagram of an illustrative apparatus for controlling asynchronous machine, which is taught in this invention. The output voltage of the converter 1 is fed into block 2, which contains a three-phase asynchronous machine (block 3), and blocks for obtaining information on torque M (block 4), rotor's angular position $\theta$ (block 5), velocity N (block 6), acceleration $\epsilon$ (block 7), magnitude of rotor's magnetic flux (the square of flux vector's moduls) $\Phi$ (block 8) and its time derivative E (block 9), vector components of magnetic flux in a stationary orthogonal coordinate system $\Phi_{60}$ and $\Phi_\beta$ (block 10). The blocks for obtaining information 4,5,6,7,8,9,10, can contain transducers of corresponding quantities, for instance tensometric, torque transducer, angular velocity transducer, Hall's generator, some other known device for calculating corresponding quantities, or one of the later described blocks for calculating corresponding quantities.

The converter 1 contains switching elements and can be a transistor power switch, a thyristor invereter, a mechanical, or some other converter transforming voltage $+U_o$, $-U_o$ into a three-phase alternating $U_R$, $U_S$, $U_T$, so that in any moment of time, any of the output phases of the converter 1 is connected to any of terminals $+U_o$, or $-U_o$ of converter's input voltage, depending on the sign of on-off control signals $U_R^*$, $U_S^*$, $U_T^*$ respectively. On-off signals are formed in block 12 in dependence on the position of rotor flux vector (components $\Phi_\alpha$ and $\Phi_\beta$), and switchover functions of the structure $S_1$ and $S_2$, which are formed in block 11 as linear combinations of the differences between the measured and set value of the torque M and M*, angular position of the rotor 9 and 9*, angular velocity of the rotor N and N* angular acceleration of the rotor E and E*, rotor flux quantities $\Phi$ and $\Phi^*$, and it's time derivatives E and E*.

Figure 2:
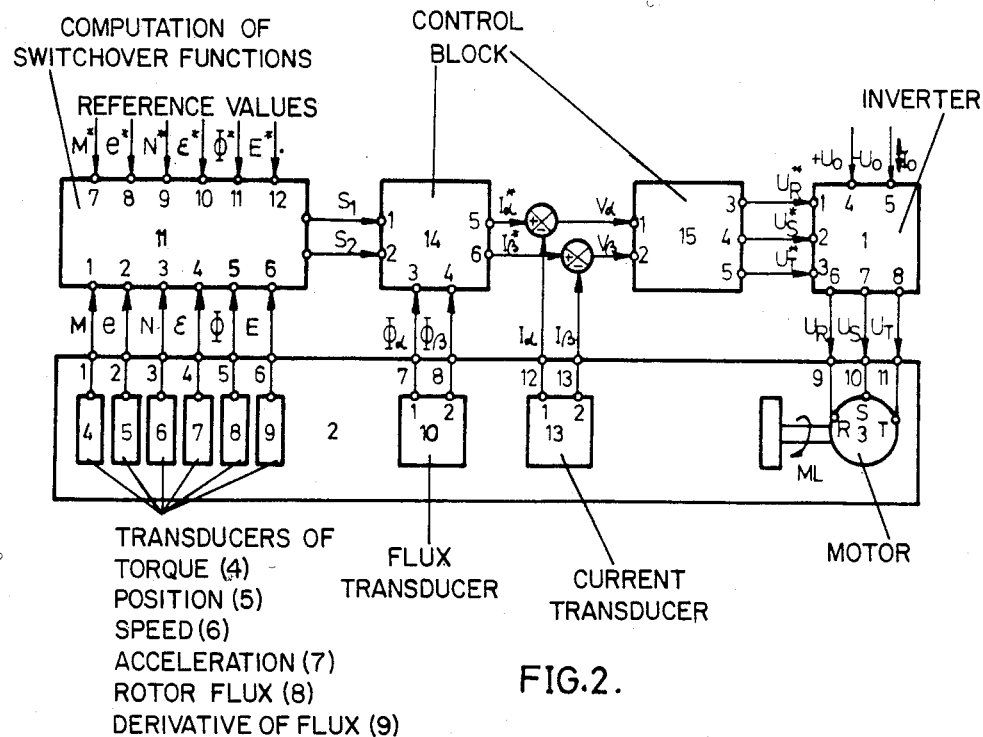
FIG. 2—a block-diagram of an alternate embodiment

FIG. 2 represents a block-diagram of an alternate apparatus for the control of asynchronous machines taught in this invention. Other than the mentioned blocks 1,2,3,4,5,6,7,8,9,10, the device for control represented in FIG. 2 contains: a block for obtaining information on the components of the measured stator current of the asynchronous machine $I_\alpha$ and $I_\beta$ in a stationary coordinate system (block 13); block 14 which forms the components of the set stator current's vector $I_\alpha^*$ and $I_\beta^*$ in a stationary system; block 15 which forms relay signals $U_R^*$, $U_S^*$, $U_T^*$, from the difference between the set and measured values of the components of asynchronous machine stator current for controlling converter 1. Block 13 can contain the transducer of phase currents R, S, T, of asynchronous machine's stator 3, for instance one with resistors, or Hall's generator, and the known devices for forming the components of the two-dimensional vector of asynchronous machine stator current in a stationary coordinate system. Blocks 15, 1, 3 and 13 form a closed loop for following set point values $I_\alpha^*$ and $I_\beta^*$ of the components of asynchronous machine stator current's vector.

Figure 3:
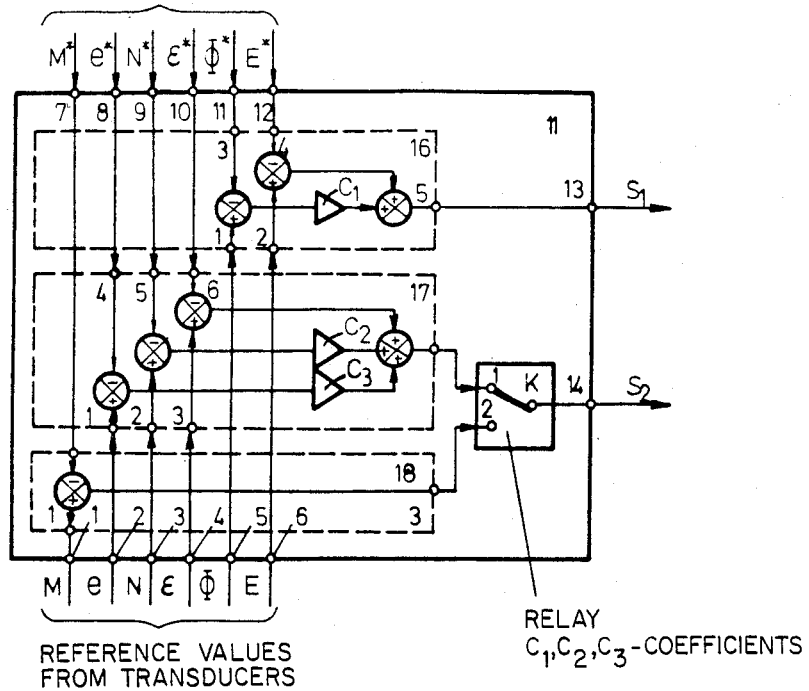
FIG. 3—a more detailed scheme of a part of the devices represented in FIGS. 1 and 2

FIG. 3 represents a moe detailed scheme of block 11 which forms the switchover functions of the structure. Block 11 contains: block 16 forming the switchover function of the structure $S_1$ which is the sum of the differences between the measured and set value of rotor magnetic flux $\Phi$ and $\Phi^*$, and their time derivatives E and E*; block 17 which forms the linear combination of differences between the measured and set value of angular position of the rotor $\theta$ and $\theta^*$, angular velocity N and N*, and angular acceleration E and E*, block 18, which forms the difference between the measured and set value of the torque M and M*; switch K, which forms the function of switchover of the structure $S_2$ which is equal to the output signal of blocks 17, or 18, depending on which quantity is controlled-torque, or angular parametars of asynchronous machine rotor. In that way structure switchover functions $S_1$ and $S_2$ are formed in block 11 as follows:

$$S_1 = E - E^* + C_1(\Phi - \Phi^*) \qquad (1)$$

$$S_2 = \begin{cases} \epsilon - \epsilon^* + C_2(N - N^*) + C_3(\theta - \theta^*) \\ \text{or} \\ M - M^* \end{cases}$$

Figure 4:
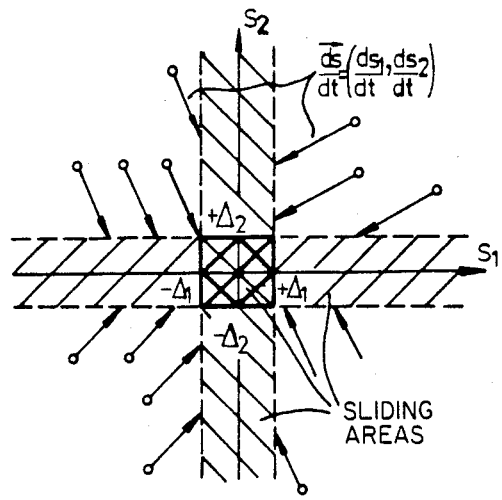
FIG. 4—a diagram which explains the function of the devices represented in FIG. 1 and 2.

FIG. 4 represents the vectors of the speed change of structure switchover function $ds/dt = (ds_1/dt, ds_2/dt)$ in the space $(S_1, S_2)$. It is assumed that in the space $(S_1, S_2)$ surrounding an area, which is given by inequalities $|S_1| < \Delta_2$, or $|S_2| < \Delta_2$, and which is determined e.g. by the values of hysteresis $\Delta_1$ and $\Delta_2$ of the elements which switch over the structures, the vector of the speed $ds/dt$ being directed towards the origin of coordinates, that is:

$$S_1 \frac{dS_1}{dt} < 0 \qquad (2)$$

$$S_2 \frac{dS_2}{dt} < 0$$

Condition (2) is the condition of the sliding mode existence in control systems represented in FIGS. 1 and 2. If condition (2) is satisfied in the whole range of values $S_1$ and $S_2$, which are realised in the process of control system functioning, then that condition is sufficient for phase point to fall in the neighborhood of coordinate system's origin $(\Delta_1, \Delta_2)$, that is in the range of "real" sliding motion at the intersection of planes $S_1 = 0$ and $S_2 = 0$. Fulfilment of condition (2) must be secured by changing the structure of control system, that is by the adequate switchover of the elements of the converter 1. In the sliding mode the point with coordinates $(S_1, S_2)$ obviously cannot leave the neighborhood or coordinate origin $(S_1, S_2)$, so the quantities $S_1$ and $S_2$ equal zero with a precision up to quantities $\Delta_1$ and $\Delta_2$. The law of controlled quantities change is given by differential equations with regard to the differences between the measured and set values of rotor flux, rotor's angular position, or the torque:

$$S_1 = 0 = \left(\frac{d}{dt} + C_1\right)(\Phi - \Phi^*), \qquad (3)$$

$$S_2 = 0 = \left( \frac{d^2}{dt^2} + C_2 \frac{d}{dt} + C_3 \right) (\theta - \theta^*)$$

or $$M - M^*$$

Equations (3) are obtained by equalizing to zero the expression for switchover functions of the structure (1), and by an obvious substitution $E = d\Phi/dt$, $M = d\theta/dt$, $s = d^2\theta/dt^2$. It should be noticed that the equations of motion of the control system in the sliding mode do not depend on parameters of asynchronous machine and power converter but they are determined by coefficients $C_1$, $C_2$, $C_3$, which can be selected according to the desired character of the process in control system, and the quantity of the problems being solved. For instance, when controlling rotor's angular parameters, if $C_2 = C_3 = 0$ is chosen, one has a system for controlling rotor's angular acceleration, with $C_2 = 0$, $C_3 = 0$, a system for controlling rotor's angular velocity, and with $C_2$, $C_3 = 0$, a system for the control of rotor's angular position.

Using the known differential equations for an asynchronous machine, and differentiating (1) in time one can obtain.

$$\frac{dS_1}{dt} = f_1^1 - K_1^1 \sqrt{\Phi U d} \qquad (4)$$

$$\frac{dS_2}{dt} = f_2^1 - K_2^1 \sqrt{\Phi U q}$$

where $f_1^1$, $f_2^1$ are some continuous functions of the coordinates of the system: currents of asynchronous machine stator and rotor, angular velocity of the rotor, the corresponding set values and parameters of asynchronous machine Rs, Rr, Lr, Ls, Lr, Lh—of reduced stator and rotor resistances, stator and rotor inductivity, and mutual inductivity, reduced inertial torque of the rotor and load J, reduced dissipation coefficient.

$$\Phi = 1 - \frac{Lh^2}{Ls \cdot Lr}$$

Ud, Uq—projections of asynchronous machine's voltage vector on the direction of rotor flux vector, and on orthogonal direction: $K_1^1$, $K_2^1$—some constant positive coefficients which are determined by the parameters of the employed asynchronous machine.

Obviously, for fulfilling the condition of existence of the sliding mode (2), it is sufficient to select the state of switching elements of the power converter supplying the asynchronous machine in such a way, that the signs of time derivatives of structure switchover functions $dS_1/dt$ and $dS_2/dt$ do not depend on the magnitude and signs of functions $f_1^1$, and $f_2^1$, which are included in equations (4), but only on the signs of components of asynchronous machine supply voltage vector Ud and Uq, while signs of the components Ud and Uq agree with signs of structure switchover functions $S_1$ and $S_2$ that is:

$$sgn\ Ud = sgn\ S_1 \qquad (5)$$

$$sgn\ Uq = sgn\ S_2$$

$$Ud > |f_1^1|/K_1^1 \sqrt{\Phi} \qquad (6)$$

$$Uq > |f_2^1|\ K_2^1 \sqrt{\Phi}$$

In that way it is sufficient, for fulfilling the codition of existence of the sliding mode (2) in the control system of an asynchronous machine, to choose the state of switching elements of the converter supplying the asynchronous machine in such a way that corresponding projections Ud, Uq of supply voltage vector agree in sign with structure switchover functions $S_1$, $S_2$—condition (5); the values of the projections of supply voltage vector must satisfy the inequalities (6).

Figure 5A:
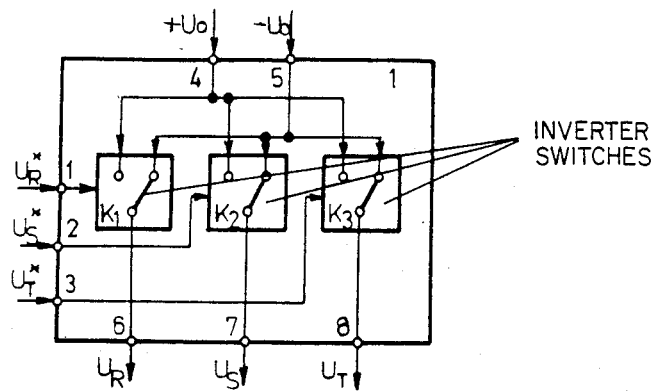
FIGS. 5a and 5b—a more detailed block-diagram of the converter and a diagram which explains the function of the device represented in FIG. 1

FIG. 5a represents a more elaborate block-scheme of the converter supplying asynchronous machine. Switches $K_1$, $K_2$, $K_3$ connect the output terminals of phases R, S, T, to the input terminals $+U_o$, or $-U_o$, depending on the sign of control signals $U_R^*$, $U_S^*$ and $U_T^*$ respectively, so the output signals $U_R$, $U_S$, $U_T$ of the converter can be considered proportional to control signals.

Figure 5B:
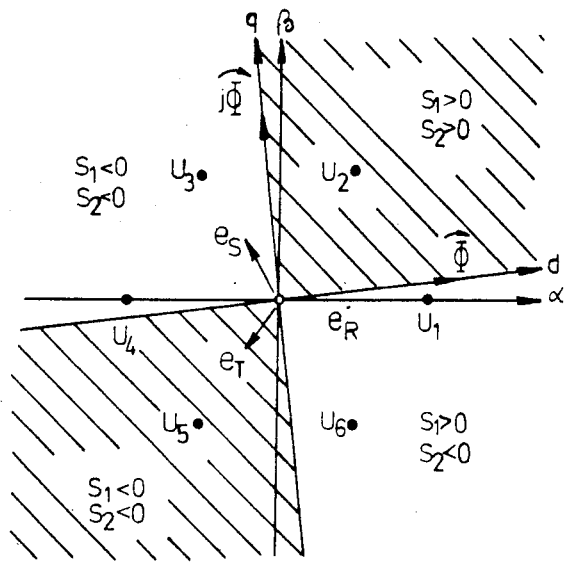

FIG. 5b represents possible positions of supply voltage vectors $\bar{U}_1$, $\bar{U}_2$, $\bar{U}_3$, $\bar{U}_4$, $\bar{U}_5$, $\bar{U}_6$ in a stationary coordinate system $(\alpha, \beta)$, which correspond to possible positions of the switch $K_1$, $K_2$, $K_3$ and phase direction vectors $e_R$, $e_S$, $e_T$, of the machine; it represents also the momentary position of rotor flux vector $\Phi$, and the vector orthogonal to it $j\Phi$, which are tied to the revolving coordinate system (d,q). The last two vectors break the planes $(\alpha, \beta)$ and (d,q) ito 4 quadrants which correspond to the possible sign combinations of structure switchover functions $S_1$ and $S_2$.

To satisfy the condition of existence of the sliding mode (5), it is necessary to select such a combination of relay control signals $U_R^*$, $U_S^*$, $U_T^*$, that the vector of supply voltage lies in the quadrant which is determined by the signs of structure switchover functions $S_1$ and $S_2$, namely for $S_1 > 0$, $S_2 > 0$ select control signals $U_R^*$, $U_S^*$, $U_T^*$, which correspond to supply voltage vector $U_2$; for $S_1 < 0$, $S_2 > 0 - U_3$ or $U_4$; with $S_1 < 0$, $S_2 < 0 - U_5$; with $S_1 > 0$, $S_2 < 0 - U_6$ or $U_1$.

Figure 6A:
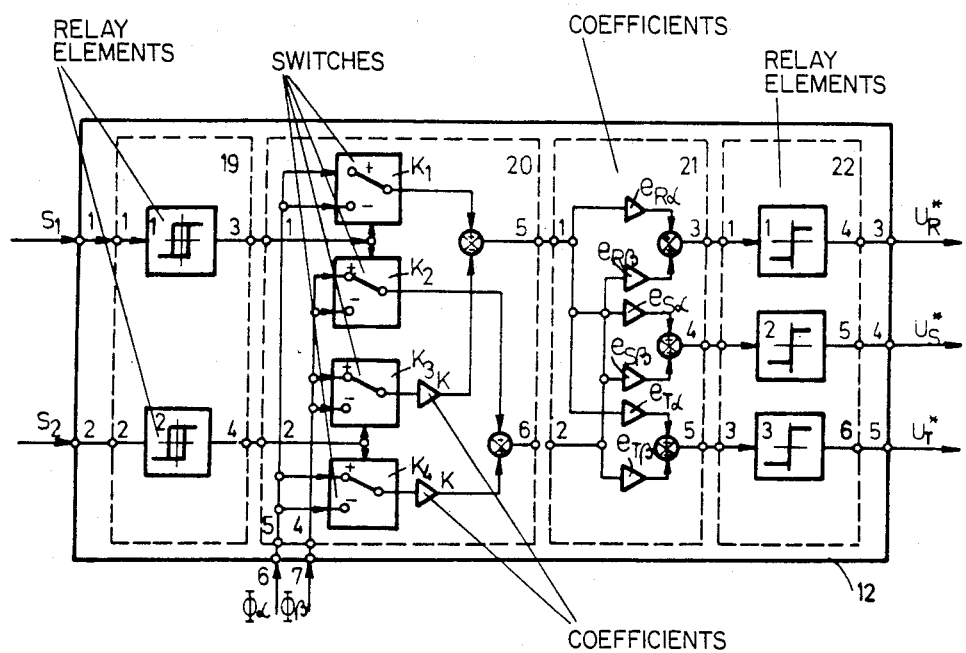
FIGS. 6a and 6b—a more detailed block-diagram of the device represented in FIG. 1, and a vector diagram which explains its function FIG. 7—a more detailed block-diagram of a part of the other device represented in FIG. 1

FIG. 6a represents a more detailed block-diagram of block 12 of the asynchronous machine control system represented in FIG. 1. Block 12 contains relay elements' block 19, to whose inputs are fed the output signals of block 11, which forms the structure switchover functions $S_1$ and $S_2$; switch elements' block 20, where to the non-inverting and inverting inputs of switching elements $K_1$, $K_2$, $K_3$, $K_4$ are fed the rotor flux vector components $\Phi_\alpha$ and $\Phi_\beta$ respectively, and switches are controlled through relay signals from block 19 output; output signals of b.20 are fed to block 21 which computes the projections of two input signals, as components of two-dimensional vector in a stationary coordinate system, on the unit vectors of phases $e_R$, $e_S$, $e_T$, of machine; three output signals of block 21 are fed to the input of relay elements' b.22, whose output signals are at the same time the output signals of block 12, so they serve as control signals $U_R^*$, $U_S^*$, $U_T^*$ for controlling converter 1 which supplies asynchronous machine.

Hereinafter, for simplicity of exposition, the term asynchronous machine may be shortened to machine—asynchronous being understood.

Figure 6B:
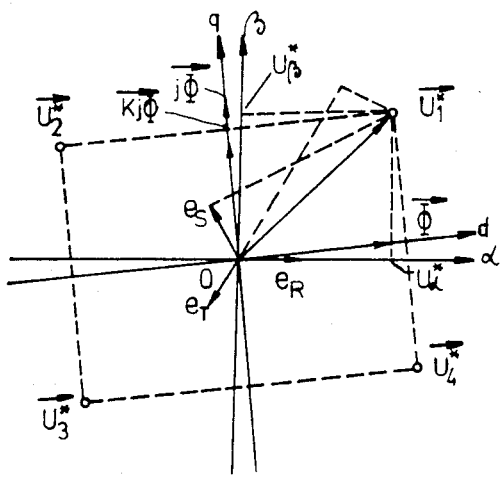

FIG. 6b represents a diagram of possible instantaneous voltage values at the outputs 5 and 6 of b.20, denoted by $U_\alpha^*$ and $U_\beta^*$, and considered as vector components $\overline{U}_1^*, \overline{U}_2^*, \overline{U}_3^*, \overline{U}_4^*$ which correspond to the four possible sign combinations of output signals of the relay elements' block 19 for controlling switches K1, K2, K3, K4 of the b.20; on the orts $e_R$, $e_S$, $e_T$, of phases R, S, T of asynchronous machine, which are computed in coefficients block 21.

Coefficient K of the output signals of switches $K_3$ and $K_4$ should satisfy the conditions $1/\sqrt{3} < K < \sqrt{13}$. If this condition is fulfilled in any moment of time, one of the relay output signals of b.12 changes its sign, when the sign of switchover function $S_1$ is changed (accounting hysteresis of relay elements of block 19), and the other two output relay signals of block 12 change their signs with sign change of switchover function $S_2$ (also taking into account hysteresis of the relay elements of block 19), or vice versa, So, depending on the instantaneous position of rotor flux vector, the switch of one phase of the converter 1 is controlled by the sign of structure switchover function $S_1$ (or $S_2$), and the switch of the other two phases by the sign of structure switchover function $S_2$ (or $S_1$).

Figure 7:
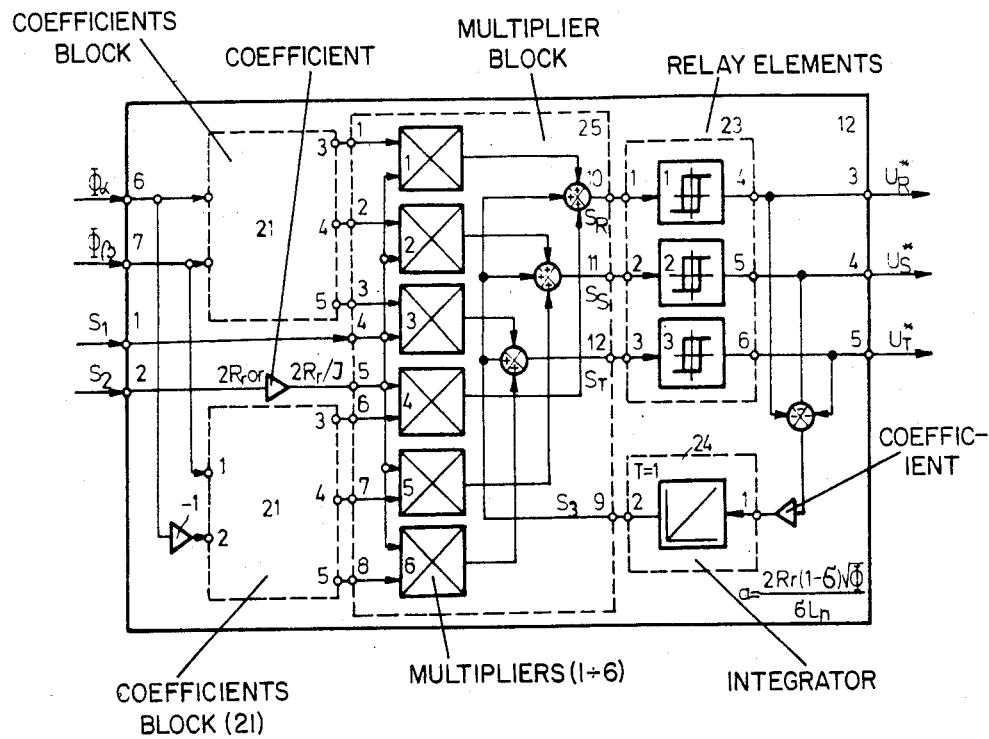

FIG. 7 represents a block-diagram of the alternate organization of block 12 which is proposed by this invention for asynchronous machine control system represented in FIG. 1. Block 12 consists of: two blocks 21 for computing the projections of input signals vectors on the unit vectors of the machine phases $e_R$, $e_S$, $e_T$, the components of rotor flux vector $\Phi_\alpha$ and $\Phi_\beta$ being fed to the corresponding inputs of one of blocks 21, and signals $\Phi_\beta$ and $-\Phi_\alpha$ to the corresponding inputs of the other block 21; block 25 of multipliers 1, 2, 3, 4, 5, 6 to whose inputs are fed the output signals from two blocks for computing the projections on phase orts $e_R$, $e_S$, $e_T$, and output signals of block 11 which forms the functions $S_1$ and $S_2$; output signals of multipliers 1, 2, 3, 4, 5, 6 are summed with input signal of b.24, which contains an integrator block; block 23 made of three relay elements with hysteresis, to whose input are fed the output signals of multipliers' block 25; output signals of relay elements' b.23, are at the same time output signals of block 12, and signals $U_R^*$, $U_S^*$, $U_T^*$ for controlling the converter 1 which supplies asychronous machine; to the input of block 24, which contains an integrator, is fed the sum of ralay signals $U_R^*$, $U_S^*$, and $U_T^*$.

Blocks 21 for computing the input projections of vector on the unit vectors $e_R$, $e_S$, $e_T$, together with multipliers' block 25, and block 24, whose output signal will be written in the form $S_3$, realize the continuous, non-singular transformation of functions $S_R$, $S_S$, $S_T$—the output signals of block 25. If coefficients of transformation are as in FIG. 7, block 25 output signals satisfy the following differential equations:

$$\frac{ds_R}{dt} = f_1^2 - K_2^2 \sqrt{\Phi \cdot U_R} \tag{7}$$

$$\frac{ds_S}{dt} = f_2^2 - K_2^2 \sqrt{\Phi \cdot U_S}$$

$$\frac{ds_T}{dt} = f_3^2 - K_2^2 \sqrt{\Phi \cdot U_T}$$

where $f_1^2$, $f_2^2$, $f_3^2$ are continuous functions, $k_2^2$ is a coefficient depending on the parameters of asynchronous machine employed. Voltages $U_R$, $U_S$, $U_T$ should satisfy the condition of sliding mode existence, that is:

$$|U_R| > |f_1^2|/K_2^2 \sqrt{\Phi} \tag{8}$$

$$|U_S| > |f_2^2|/K_2^2 \sqrt{\Phi}$$

$$|U_T| > |f_3^2|/K_2^2 \sqrt{\Phi}$$

Coincidence of signs of the voltages $U_R$, $U_S$, $U_T$ with the signs of relevant functions $S_R$, $S_S$, $S_T$ is secured by the relay elements' block 23, which forms the signals for controlling the converter. In that way, block 12, which is proposed in this invention and represented in FIG. 7, secures the sliding mode at the intersection of three structure switchcover areas $S_R=0$, $S_S=0$, $S_T=0$. The quantities $S_R$, $S_S$, $S_T$ in sliding mode are equal to zero, with a precision up to the structure switchover of the control system (switchover of the output phase voltages of the converter supplying asynchronous machine). Because of the nonsingular character of transformation carried out in blocks 21 and 25, the functions $S_1$, $S_2$, $S_3$ are also equal to zero with a precision up to the value of hysteresis. In the sliding mode desired character of the process of controlling asynchronous machine is achieved, as earlier, by selecting coefficients of linear combinations (3). Equalizing to zero the quantity $S_3$—output signal of block 24, which contains an integrator (of a precision up to hysteresis value), means equalizing to zero the mean (with a precision up to the high frequency component) sum of three signals for controlling the converter $U_R^*$, $U_S^*$, $U_T^*$, or the signals proportional to them —the output signals of phases $U_R$, $U_S$, $U_T$ of the converter supplying the asynchronous machine. In that way block 12, represented in FIG. 7, provides for the desired character of the change of asynchronous machine's rotor flux, torque, or angular position, angular velocity and angular acceleration of the rotor in the system for the control of asynchronous machine represented in FIG. 1, and secures that output voltage of the converter supplying asynchronous machine are three-phase "in the mean."

Figure 8:
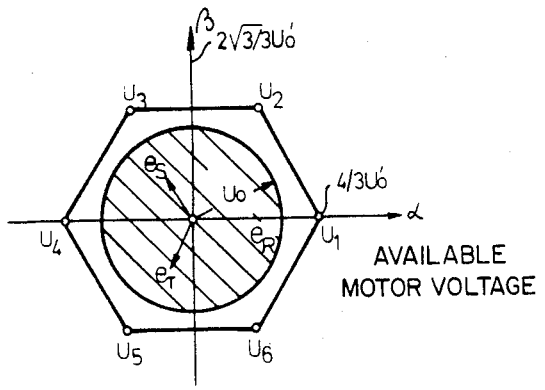
FIG. 8—a comparative vector diagram which explains the function of the two devices represented in FIGS. 6 and 7

FIG. 8 represents a diagram of possible effective voltages supplyng machine in the control system represented in FIG. 1. If block 12, for forming the signals which control converter 1, represented in FIG. 6, is applied, the vector of machine effective supply voltage can be any of the vectors in the hexagonal area $U_1$, $U_2$, $U_3$, $U_4$, $U_5$, $U_6$. When applying block 12 for forming the signals which control the converter 1 (represented in FIG. 7), the vector of machine effective supply voltage can be any of the vectors in the circle of the radius $U_o$ (the hatched circle in FIG. 8), which lies entirely inside the hexagonal area $U_1$, $U_2$, $U_3$, $U_4$, $U_5$, $U_6$. The decrease of the range of possible values of the vector of machine effective supply voltage is explained by the fact that the condition of three phase output voltages of the converter supplying as machine is fulfilled "in the mean".

It is worth noticeing that in the steady state with rotor's angular velocity M, and load torque $M_L$ of machine, constant, the functions $f_1^1$ and $f_2^1$, included in the equations (4), are constant. Accordingly in the sliding mode the components Ud and Uq of voltage vector are also constant "in the mean" (with a precision up to the value of high frequency component) while the components of vectors of voltage $U_\alpha$ and $U_\beta$, currents $I_\alpha$ and $I_\beta$, and flux $\Phi_\alpha$ and $\Phi_\beta$ of machine in a steady coordinate system, are sine functions. However, "the mean values" of output phase voltages of the converter supplying machine when applying b.12 for forming signals that control the converter represented in FIG. 6a does not have to be harmonic functions. At the same time, in the same conditions of the steady state, as are the above stated conditions, functions $f_1^2$, $f_2^2$, $f_3^2$, included in equations (7), are harmonic functions. So, when applying block 12, for forming signals which control the converter, represented in FIG. 7, in the sliding mode "the mean" (with precision up to the value of high frequency component) value of output phase voltages of the converter $U_R$, $U_S$, $U_T$ is also a harmonic function.

If a regulated power suply is used for supplying machine, or a voltage supply with an inner loop for the control of machine's stator current, the sliding mode of control system can be secured by selecting the derivative of corresponding machine stator current's component from the set of two possible values.

Using the known differential equations of machine and differentiating (1), we get:

$$\frac{dS_1}{dt} = f_1^3 - K_1^3 \frac{dI_d^*}{dt} \quad (9)$$

$$\frac{dS_2}{dt} = f_2^3 - K_1^3 \frac{dI_d^*}{dt}$$

where $f_1^3$ and $f_2^3$ are some continuous functions of machine's condition, and the system disturbances, $K_1^3$, $K_2^3$—constant positive coefficients which are determined by the as machine's parameters; $dI_d^*/dt$ and $dI_q^*/dt$—derivatives of components of as machine stator current in an orthogonal coordinate system oriented in the direction of rotor flux vector. It follows from the equations (9) that the condition for sliding mode existence in as machine control system (2) can be fulfilled depending on the sign of structure switchover functions $S_1$ and $S_2$, when components $dI_d^*/dt$ and $dI_q^*/$ satisfy these conditions:

$$\text{sgn} \frac{dI_d^*}{dt} = \text{sgn } S_1 \quad (10)$$

$$\text{sgn} \frac{dI_q^*}{dt} = \text{sgn } S_2$$

$$\left| \frac{dI_d^*}{dt} \right| > |f_1^3|/K_1^3 \sqrt{\Phi} \quad (11)$$

$$\left| \frac{dI_q^*}{dt} \right| > |f_2^3|/K_2^3 \sqrt{\Phi}$$

Figure 9:
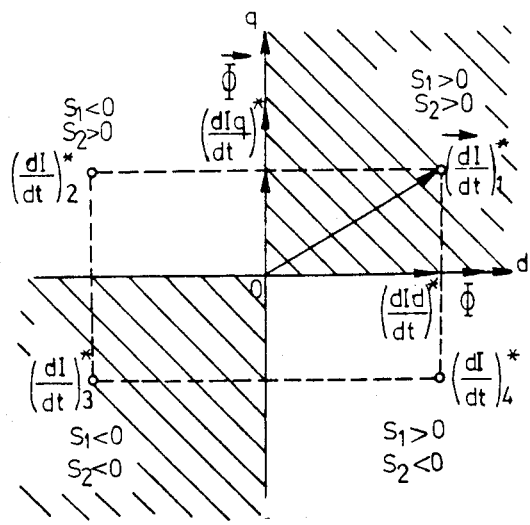
FIG. 9—a vector diagram which explains the function of the device represented in FIG. 2

To explain the operation of the device for the control of machine, which is represented in FIG. 2, FIG. 9 represents a diagram of possible positions of vectors $(dI_D^*/dt, di_q^*/dt)$, which consists of time derivatives of machine stator current's components in a coordinate system tied to the rotor flux vector $\Phi$, which correspond to the possible sign combinations of structure switchover functions $S_1$ and $S_2$.

Figure 10:
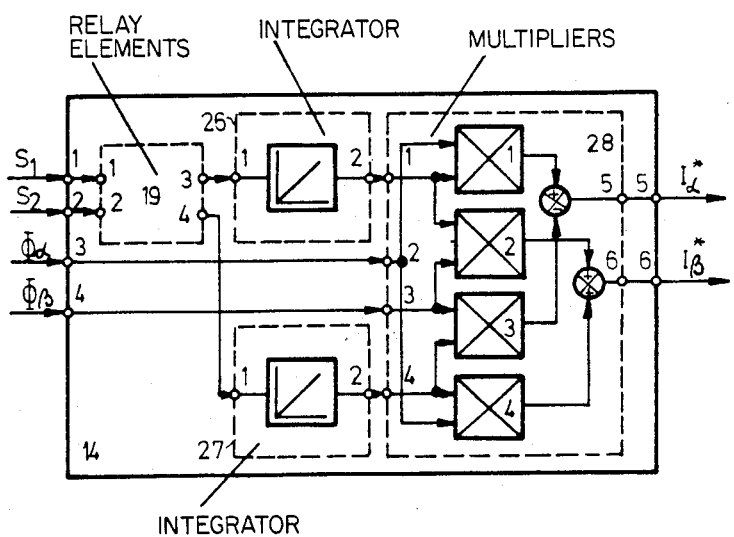
FIG. 10—a more detailed block-scheme of a part of the device represented in FIG. 2

FIG. 10 represents a more elaborate block-diagram of block 14 of the device for machine control, with an inner loop for the stator current, represented in FIG. 2. Block 14, for forming the set point value of machine stator current, contains: block 19, or relay elements with hysteresis, to whose input the output signal from b.11 is fed, which forms structure switchover functions $S_1$ and $S_2$; two blocks of integrator elements 26 and 27, to whose inputs are fed the output signals of relay elements' block 19; multipliers block 28, to whose inputs are fed the output signals of integrator elements blocks 26 and 27, and rotor flux vector's components $\Phi_\alpha$ and $\Phi_\beta$ in a stationary coordinate system; the output signals of multipliers' block 28 are the components $I_\alpha^*$ and $I_\beta^*$ of the set current of machine stator in a stationary coordinate system, and are fed into block 15, which is included in the contour for machine stator current. The output signals of integrator elements' blocks 26 and 27 are components $I_d^*$ and $I_q^*$, respectively, of the set stator current in a coordinate system which rotates together with machine rotor flux vector. Multipliers block realises the transformation of components $I_d^*$ and $I_q^*$ into the stationary coordinate system $(\alpha, \beta)$, with a precision up to the multiplicator of the modulus of machine rotor flux vector. As machine rotor flux is in many cases in practice kept at the set level $\Phi^* = \text{const}$, this multiplication is not essential, and can be taken into account by selecting the coefficient of amplification for corresponding quantities.

Figure 11:
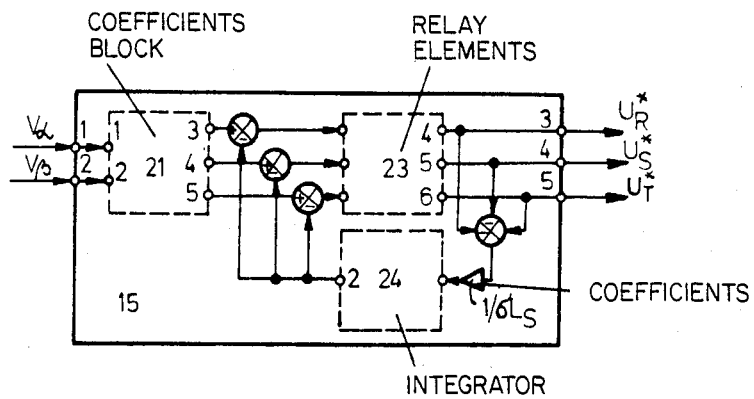
FIG. 11—a more detailed block-scheme of a part of the device represented in FIG. 2

FIG. 11 represents a detailed block of block 15 which forms signals $U_R^*$, $U_S^*$, $U_T^*$ for controlling the converter in the control system represented in FIG. 2. Block 15 consists of: block 21 for calculating the projections $V_\alpha$ and $V_\beta$ of the vector, composed of the difference between the components of the measured and set value of asynchronous machine stator current in a stationary coordinate system, on the unit vectors $e_B$, $e_S$, $e_T$, of as machine; block 23 of relay elements with hysteresis, to whose input are fed the differences between the corresponding output signals of block 21 for computation of the vector projections, and the output signal of block 24; block 24 consists of an integrator element to whose input is fed the sum of the output signals $U_R^*$, $U_S^*$, $U_T^*$; the output signals of block 15—signals which control the converter supplying the machine, are the output signals of relay elements block 23.

The input signals of relay elements block 23, which are denoted by $S_R$, $S_S$, $S_T$, when the values of coefficients are as in FIG. 11, are governed by the following differential equations:

$$\frac{dS_R}{dt} = f_1^4 - K_2^4 U_R \quad (12)$$

$$\frac{dS_S}{dt} = f_2^4 - K_2^4 U_S$$

$$\frac{dS_T}{dt} = f_3^4 - K_2^4 U_T$$

where $f_1^4$, $f_2^4$ and $f_3^4$ are continuous functions, $K_2^4$—a constant positive coefficient which is defined by machine's parameters. Under a discrete variation of $U_R$, $U_S$, $U_T$, the sliding mode is established in the system (12) at the intersection of the areas $S_R = 0$, $S_S = 0$, $S_T = 0$, if the conditions of its existence are fulfilled:

$$\text{sgn } U_R = \text{sgn } S_R \quad (13)$$

$$\text{sgn } U_S = \text{sgn } S_S$$

$$\text{sgn } U_T = \text{sgn } S_T$$

$$|U_R| > |f_1^4|/K_2^4 \quad (14)$$

-continued $$|U_S| > |f_2^4|/K_2^4$$

$$|U_T| > |f_3^4|/K_2^4$$

In the steady state, with the rotor's angular velocity of rotation, and the load torque of machine constant, the functions $f_1^4$, $f_2^4$, $f_3^4$ which are included in the equation (12), are sinusoidal functions. Thus, in the sliding mode, the output phase voltages of the converter supplying machine (if block 15, represented in FIG. 11, is used for forming the signals for controlling the converter change "in the mean" (with a precision up to the high frequency component) according to the sinusoidal law, too. If sinusoidality of "mean" values of converter phase voltages is not obligatory, (e.g. when machine's windings are connected without the zero lead), then, putting aside the integral condition of converter's output voltages forming a three-phase system, the power indices of controlled electric drive can be improved by reducing the number of commutations of converter's switch. The other functional characteristics of the control system will, nevertheless, be preserved.

Figure 12:
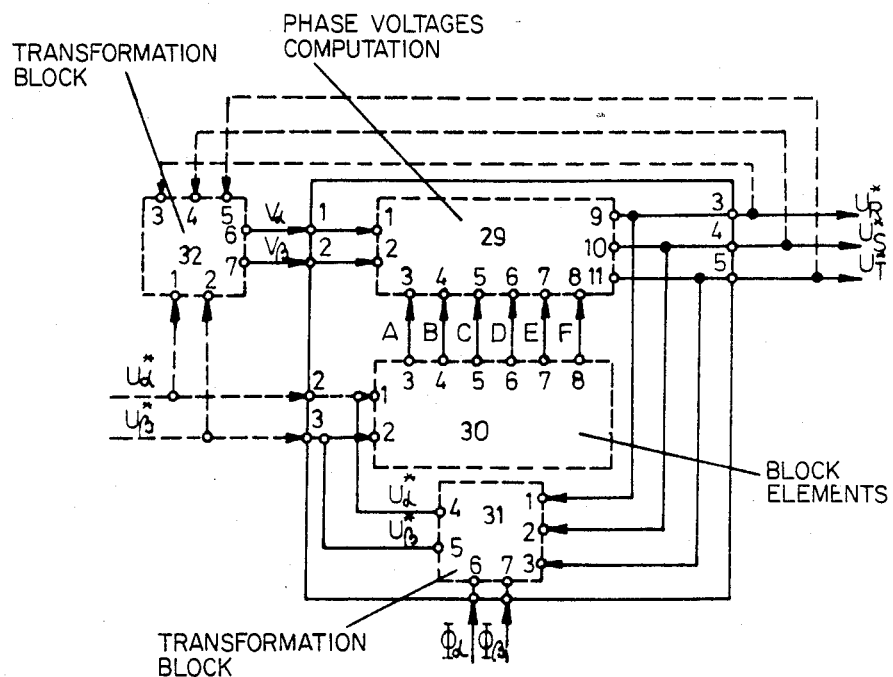
FIG. 12—a more detailed block-diagram of a part of the other device represented in FIG. 2

FIG. 12 represents a block-diagram of the alternate block 15 which forms signals $U_R^*$, $U_S^*$, $U_T^*$ for converter control system, represented in FIG. 2; this block realises the control algorithm with a minimal number of converter commutations. Block 15 consists of: block 29 which forms control signals $U_R^*$, $U_S^*$, $U_T^*$, to whose input are fed the signals of difference between the components of measured and set value of asynchronous machine stator current in a stationary coordinate system, and relay signals A, B, C, D, E, F (formed in block 30) which determine the phase of the converter when the switch is in the fixed position; block 30, which forms the signals for selecting that converter phase, in which there is no switchover at the given moment, to whose input are fed the signals from block 31, block 31, which computes the components $U_\alpha^*$ and $U_\beta^*$ of effective machine supply voltage in a stationary coordinate system, to whose input are fed the signals $U_R^*$, $U_S^*$, $U_T^*$ for the control of the converter represented in FIG. 12, which supplies machine can be used in an open control loop: in that case, output signals $U_\alpha^*$ and $U_\beta^*$ of block 30 must be the components of the desired as machine supply voltage, which are obtained from the device for setting the voltage; input signals of block 32, which calculate the integral error of the set and measured value of machine supply voltage, and which is represented in FIG. 12 via dotted lines.

Figure 13A:
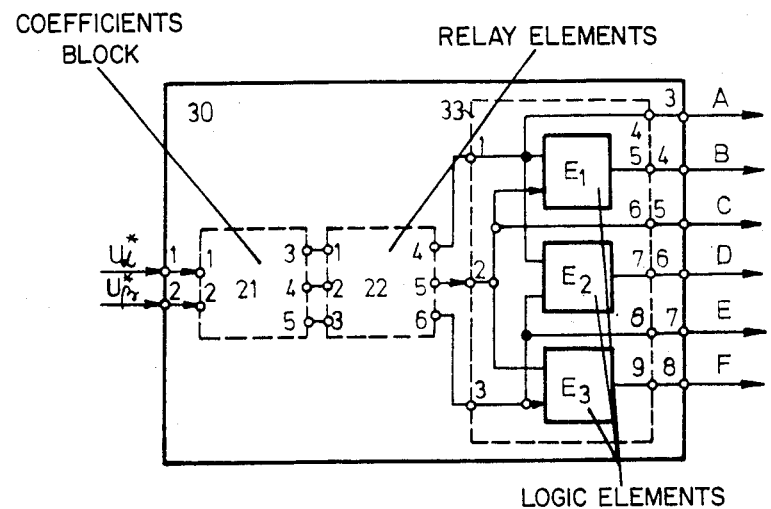
FIGS. 13a and 13b—a more detailed block-diagram of a part of the device represented in FIG. 12, and a vector diagram which explains the functioning of the device FIG. 14—a more detailed block-diagram of a part of the device represented in FIG. 12

FIG. 13a represents a more detailed block-diagram of block 30, which forms the signals for selecting the non-commutating phase of the converter supplying machine, which is included in block 15 represented in FIG. 12. Block 30 consists of: block 21 which computes the projections of vector U* of the machine effective supply voltage, whose components $U_\alpha^*$ and $U_\beta^*$ are, in a stationary coordinate system, the input signals of b.21, on the block machine's phase unit vectors $\epsilon_R$, $\epsilon_S$, $\epsilon_T$; relay elements block 22 to whose input are fed the output signals of block 21, a block of logic elements $E_1$, $E_2$, $E_3$ to whose inputs are fed the output signals from the ralay elements block; output signals A, C, E and B, D, F from block 30, are at the same time output signals of relay elements' block 22, and block of logic elements 33, respectively. Logic of elements $E_1$, $E_2$, $E_3$ is given by the following relation:

| X | Y | Z |
|---|---|---|
| +1 | +1 | +1 |
| −1 | +1 | −1 |
| +1 | −1 | −1 |
| −1 | −1 | +1 | where X and Y are the input signals of logic elements, Z is the output signal.

Figure 13B:
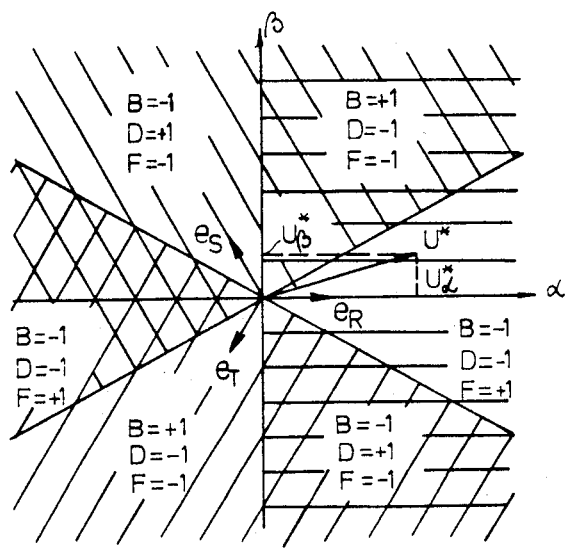

FIG. 13b represents a vector diagram of possible values of output signals of the logic block 33 (for all posible positions of vector U*), which explains the function of block 30. As it is seen in FIG. 13b, the plane $(\alpha,\beta)$ is divided into six parts, so that, if vector U* makes a minimal angle with part orts $\epsilon_R$, $\epsilon_S$, $\epsilon_T$, of as machine, the signals F, D or B equal +1; in the opposite case, signals F, D or B equal −1.

Figure 14:
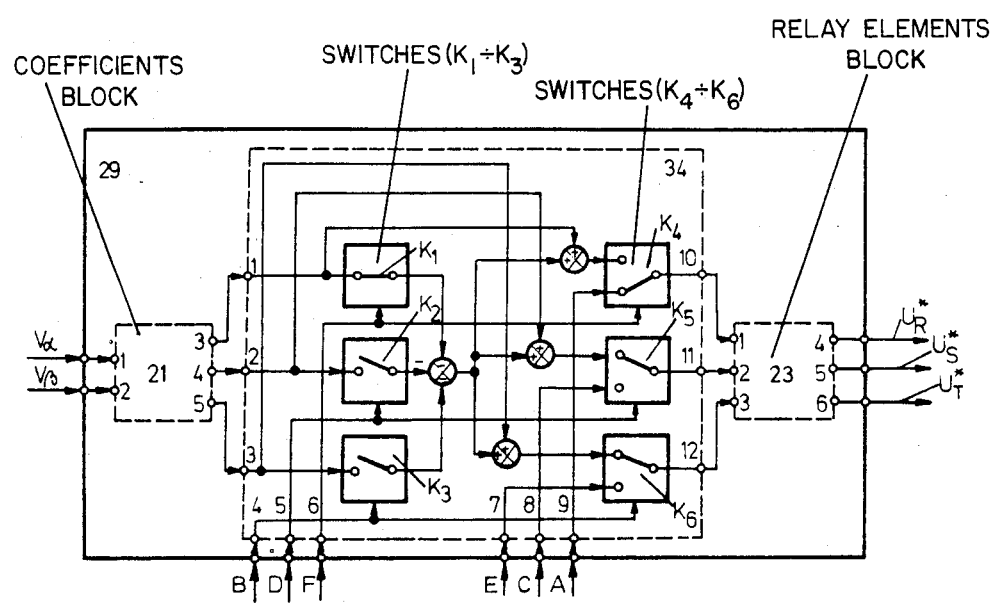

FIG. 14 represents a more detailed block-diagram of block 29 which is included in block 16 represented in FIG. 12. Block 29, which forms signals $U_R^*$, $U_S^*$, $U_T^*$ for the control of converter which supplies as machine, consists of: block 21, which computes projections of vector, whose components are differences between components $V_\alpha$ and $V_\beta$ of measured and set value of machine stationary current, in a stationary coordinate system, on unit vectors of phase $e_R$, $e_S$, $e_T$, of asynchronous machine; block 34 containing switches $K_1$, $K_2$, $K_3$ and $K_4$, $K_5$, $K_6$ where the output signals of block 21 are fed to the inputs of switches $K_1$, $K_2$, $K_3$; the differences between the corresponding output signals of block 21 and the sum of output signals of switches $K_1$, $K_2$, $K_3$ are fed to the upper inputs of switches $K_4$, $K_5$, $K_6$, while the output relay signals A, C, E, of block 30, which is included in block 15 represented in FIG. 12 are fed to the lower imputs of switches $K_4$, $K_5$, $K_6$, and the output relay signals F, D, B, of the mentioned b.30 are fed to the control imputs of switches $K_1$ and $K_4$, $K_2$ and $K_5$, $K_3$ and $K_6$, block 23 of relay elements with hysteresis, to whose input the output signals of block 34 are fed; output signals of block 29—signals for the control of the converter which supplied as machine—are the output relay signals of block 23.

In accordance with the logic of block 30 functioning, only one of output signals B, D, F of block 30 equals +1 at any instant. Therefore, at any instant, only one of switches $K_1$, $K_2$, $K_3$ of block 34 (which is included in block 29) is on, and only one of switches $K_4$, $K_5$, $K_6$ lets through the relay signals E, C, or A, fed from the output of block 30, while the switches $K_1$, $K_2$, $K_3$, $K_4$, $K_5$, $K_6$ remain in the fixed position in the time interval during which the vector of effective voltage is in one of six hatched areas in FIG. 13b. In such a way, during this time interval one of the signals $U_R$, $U_S$, $U_T$, which controls the converter, does not change the sign. The output voltage corresponding to the relevant phase of the converter supplying asynchronous machine does not change either. The input signals of block 23, which is included in block 29, denoted by $S_R$, $S_S$, $S_T$ respectively, with the coefficients values as shown in FIG. 14, satisfy the following differential equation:

$$\frac{dS_i}{dt} = f_1^5 - K_1^5 U_i \tag{15}$$

$$\frac{dS_j}{dt} = f_2^5 - K_1^5 U_j$$

$$S_k = 0$$

```
i    R    S    T
J =  S or T or R
k    T    R    S
``` where $f_1{}^5$ and $f_2{}^6$ are some functions, continuous in the given interval. In such a way, provided the conditions of existence (15) are fulfilled, sliding mode for which $S_i=0$, $S_j=0$ is established in the system, with a precision up to hysteresis of relay elements included in block 23. Accordingly, signals $V_\alpha$ and $V_\beta$ of block 29 equal zero with a precision up to hysteresis.

Figure 15A:
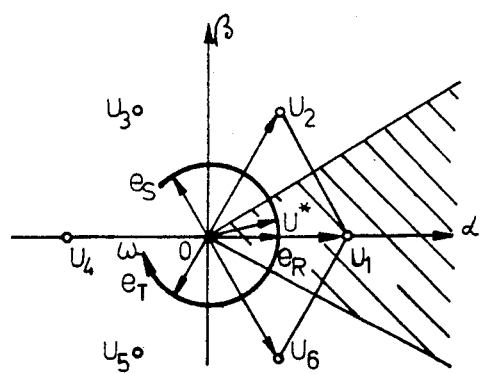
FIG. 15—a vector and time diagram which explains the function of the device represented in FIG. 12

FIG. 15a represents a vector diagram which explains the operation of block 15 represented in FIG. 12, which is included in machine control system represented in FIG. 2. If the effective voltage vector U* lies in the hatched range in FIG. 15a, the output voltage of converter's phase R does not vary, and is equal to $+U_o$. In the sliding mode the voltage of converter's phases S and T varies in such a way that the set machine's effective supply voltage is provided; then four vectors of supply voltage are possible: 0, $U_1$, $U_2$, $U_3$, and they correspond to possible states of converter's switch.

Figure 15B:
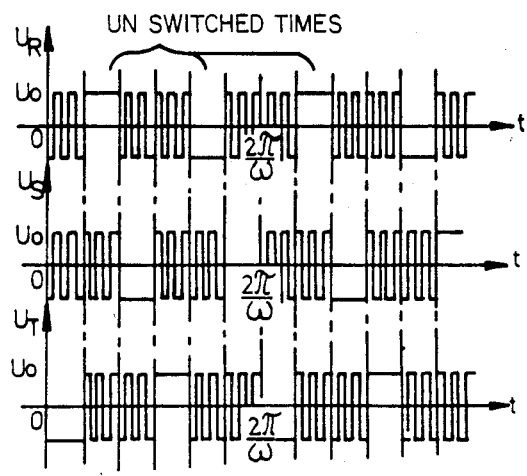

FIG. 15b represents output voltages of the converter vs. time, with a condition that effective supply voltage of machine varies sinusoidally. The intervals in which the output voltage of phase R of the converter supplying machine does not change sign, are marked in FIG. 15b. As it follows from FIG. 15b, independently of the amplitude of machine effective supply voltage which varies sinusidaly, the output voltage of each of phases $U_R$, $U_S$, $U_T$ of the converter supplying machine does not change sign during one third of the period of harmonic effective voltage. The change of "mean" (with a precision up to the high frequency component) output phase voltage of the converter differs in this case from sinusoidal form, even in the steady state asynchronous machine's operation.

Figure 16:
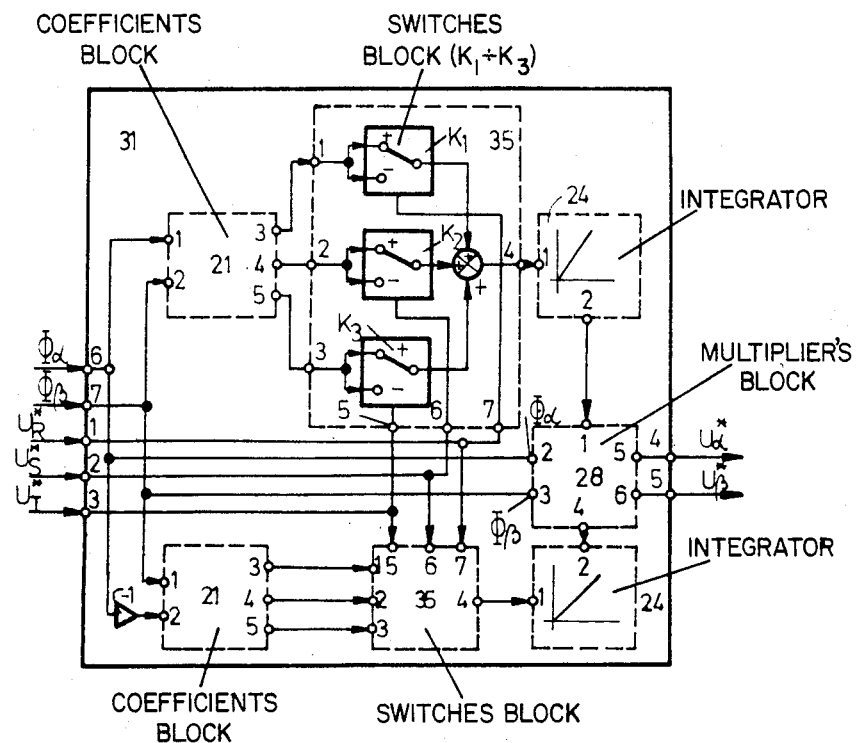
FIG. 16—a more detailed block-scheme of the other part of the device represented in FIG. 12

FIG. 16 represents a more detailed block-diagram of block 31 (which is included in block 15 represented in FIG. 12) which computes the effective machine supply voltage. Block 31 consists of: two blocks 21 for computing vector projections on unit vectors of phases $e_R$, $e_S$, $e_T$, of machine, components $\Phi_\alpha$ and $\Phi_\beta$ of machine rotor flux vector being fed to the inputs of one block 21, while the components $\Phi_\beta$ and $\Phi_\alpha$ of vector $j\Phi$, orthogonal on asynchronous machine rotor flux vector are fed to the inputs of the other block 21; two blocks 35, each consisting of three switching elements, where the output signals from two blocks 21 respectively are fed to the non-inverting and inverting input of switches $K_1$, $K_2$, $K_3$ of each block 35; the relay signals $U_R$, $U_S$, $U_T$, which control the switch supplying machine are fed to control inputs of switches $K_1$, $K_2$, $K_3$ of both of blocks 35 while the outputs of switches $K_1$, $K_2$, $K_3$ of each block 35 are summed up; two blocks 24, which consist of one inertial block each, whose input signals are output signals of blocks 35; block 28 which realizes the transformation of vector (whose components are output signals of blocks 24) from coordinate system (d,q), rotating together with rotor flux, into stationary coordinate system $(\alpha, \beta)$.

Block 28 inputs are outputs of inertial blocks 24, and of components $\Phi_\alpha$ and $\Phi_\beta$ of as machine rotor flux vector. Output signals of block 28 are components $U_\alpha^*$ and $U_\beta^*$ of as machine supply voltage (with a precision determined by the multiplicator). In its nature block 31 is a vector filter, which enables computing effective value of machine supply voltage without phase shift, accounting for the particularity of switching character of output voltage of the converter supplying asynchronous machine.

Figure 17:
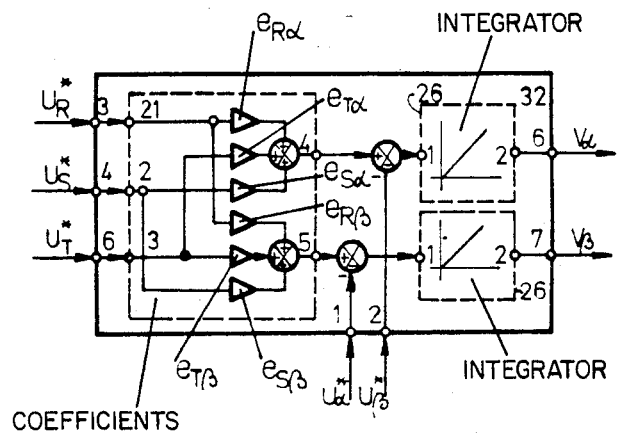
FIG. 17—a more detailed block-diagram of the other part of the device represented in FIG. 12

FIG. 17 represents a more elaborate block-diagram of block 32, which computes the integral error of measured and set point value of machine supply voltage, included in blocks represented in FIG. 12. Block 32 consists of: block 36 which computes two-dimensional vector of voltage from the signals $U_R^*$, $U_S^*$, $U_T^*$ for the control of converter which calculate the difference between measured and set values of components of machine supply voltage vector; two integrator blocks 26, whose input signals are the differences between the components of measured and set value of machine supply voltage, and their outputs are the integral error of machine supply voltage.

This text by now has described the basic methods of synthesizing the asynchronous machine control system on theoretical grounds of control system with varibale structure, and especially, on the basis of introducing the sliding mode of control system's operation. The frequency of sign change of switchover functions and the operational frequency of the switch of the converter supplying asynchronous machine, can be in a real system 100 Hz – 2 KHz, and is determined by the minimum allowed time interval between two switchovers of each converter's power switch. In order to choose the desired switchover frequency, one should choose the corresponding frequency of switching over the hysteresis of relay elements which determine the signs of structure switchover functions, and the signals for converter control, or, apply block 37 for automatical setting of the operational frequency of switching elements, represented in FIG. 18a. Block 37 contains three identical devices, each of which is connected to the corresponding output of any of devices for forming the signals $U_R^*$, $U_S^*$, $U_T^*$ described above, or to the inputs of devices which form the input signals of relay elements of devices for forming signals $U_R^*$, $U_S^*$, $U_T^*$, and the output relay signals of block 37 are signals for the control of the switches of the converter supplying asynchronous machine.

Each of three device of block 37 consists of two amplifier 1 and 2 in positive feedback: a passive inertial network consisting of resistors R and $(1+(2/K))$ R, and a capacitor C, the resistors being connected to the output terminals of corresponding amplifiers; the voltage of capacitor C is fed to the inverting input of amplifier 2, while the output voltage $\pm U_o{}^1$ of amplifier 2 is fed, via a resistor $K_1R_1$, to the non-inverting input of amplifier 1; the input signal of block 37 is fed to the inverting input of amplifier 1, output voltage $U_{out}=\pm U_o{}^1$ of amplifier 1 is the output signal of block 37. Block 37 operation is determined by hysteresis magnitude in relation to the input signal, and by the time interval $\tau$ between two successive sign changes of output signal:

$$\Delta = \frac{K_1 - 1}{1 + K_1} \cdot U_o{}^1 \tag{16}$$

$$\delta = \frac{2+K}{2(1+K)} RC \ln\left(1 + \frac{2}{K}\right)$$

Figure 18B:
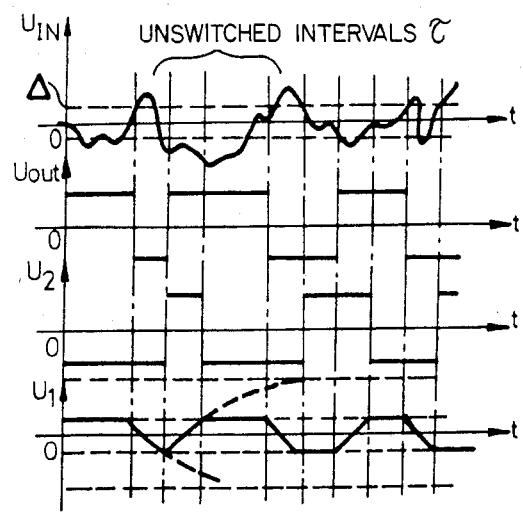
FIG. 18—a more detailed scheme of the other part of the devices represented in FIGS. 1 and 2, and a time diagram which explains the functioning of the suggested device FIG. 19—a more detailed block-diagram of the other part of the proposed devices represented in FIGS. 1 and 2
Figure 18A:
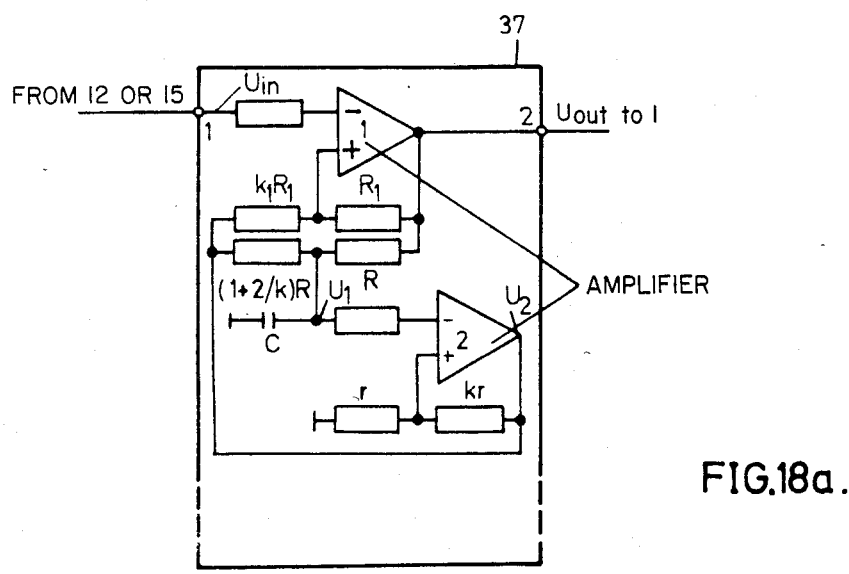

FIG. 18b represents a diagram of voltage change at some points of block 37, which explains its function. After the sign of output signal of converter 1 changes, voltage $U_1$ of capacitor C varies exponentially, with time constant $$\frac{(2+K)^1}{2(1+K)} RC$$

with the initial condition $\pm U_o{}^1/(1+K)$, whose value is equal to the hysteresis of amplifier 2. Exponential voltage change on capacitor C has duration $\tau$ until reaching the value $\pm U_o{}^1/(1+K)$ in that interval the output voltage of amplifier 1 does not change sign with no regard to the possible changes of sign and value of input voltage of block 37. That interval over, the output voltage of amplifier 2 changes its sign; the sign of output voltage of amplifier 1 will be determined after that by the sign of input signal of block 37, accounting the hysteresis value $\Delta$.

Figure 19:
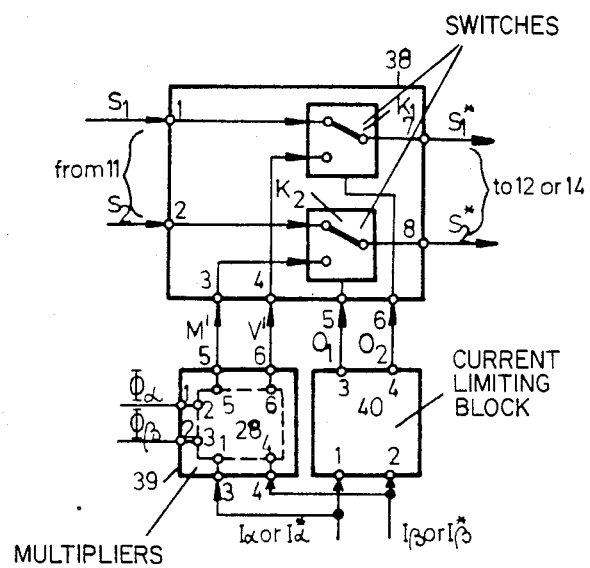

When realizing systems for the control of machine, which are taught in the present invention and represented in FIGS. 1 and 2, it may be necessary to apply a device for limiting machine's stator current, which is explained e.g. by maximum allowed values of switch currents in the converter supplying mchine, maximum allowed power dissipated in stator windings, etc. Block-scheme of the device for limitting the current in control systems represented in FIGS. 1 and 2, is represented in FIG. 19. The device for limitting the current consists of: block 38, located between blocks 11 and 12 of the control system represented in FIG. 1, or between blocks 11 and 14 of control system represented in FIG. 2, and it consists of switches $K_1$ and $K_2$ which form the structure switchover functions $S_1{}^*$ and $S_2{}^*$, which equal functions $S_1$ and V', and $S_2$ or M', respectively; block 39 which consists of previously described block 23, which forms quantities V' and M' equal respectively to $I_\alpha \Phi_\alpha + I_\beta \Phi_\beta$ and $I_\alpha \Phi_\alpha - I_\beta \Phi_\alpha$; block 40, forming relay signals $O_1$ and $O_2$ for controlling switches $K_2$ and $K_1$ of block 38 by input signals—components of machine stator current $I_\alpha$ and $I_\beta$. Quantity M is proportional to the machine torque, and quantity V is equal to the scalar product of stator current vector, and machine's rotor flux, and it characterizes current component Id which forms magnetic flux. Relay signals $O_1$ and $O_2$ for the control switches $K_1$ and $K_2$ are formed by the following law:

$$O_1 = \begin{cases} +1 \text{ if } I_{inst} > P_2 \\ -1 \text{ if } I_{inst} < P_2 \end{cases} \quad (17)$$

$$O_2 = \begin{cases} +1 \text{ if } I_{inst} > P_1 \\ -1 \text{ if } I_{inst} < P_1 \end{cases}$$

where $I_{inst} = \max\{|I_R|, |I_S|, |I_T|\}$—maximum value of phase currents of the converter supplying as machine; $P_1$ and $P_2$—the permitted set values of converter's phase currents. Values of $P_1$ and $P_2$ must be smaller than the maximum permitted value of converter's phase currents, and $P_1 < P_2$. If $O_1 = O_2 = -1$, that is, if asynchronous machine's stator current does not exced $P_1$ and $P_2$ levels the switches $K_1$ and $K_2$ of block 38, represented in FIG. 19, are in upper position i.e. $S_2{}^* = S_2$, and $S_1{}^* = S_1$.

Figure 20A:
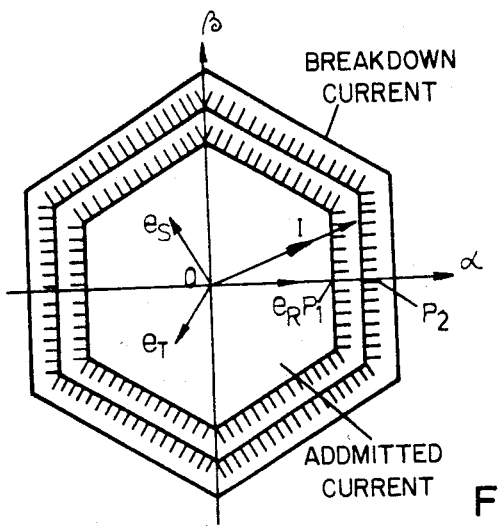
FIGS. 20a and 20b—a vector and time diagram explaining the function of the devices represented in FIG. 19

FIG. 20a represents a vector diagram which explains the choice of allowed values of phase currents $P_1$ and $P_2$. Introduction of two comparative levels of $P_1$ and $P_2$, and two signals $O_1$ and $O_2$ for switch control, enables adding the following functional qualities to a control system: if phase point $S = (S_1, S_2)$ is outside the sliding mode zone $|S_1| > \Delta_1$ and $|S_2| > \Delta_2$, the magnetic circuit is magnetized by the maximum possible current $I_d = I_{inst} = P_2$, machine rotor flux will tend to reach the set value $\Phi^*$ at the maximal possible speed; if the sliding mode is established in the area $S_1 = 0$ (namely machine's rotor is sufficiently magnetized), but $|S_1| > \Delta_2$, then $I_{inst} = P_1$, stator current component $I_d$, which magnetizes as machine's rotor, being kept in accord with the demanded change of rotor flux $\Phi$ and stator current component $I_q$, which forms torque M, is kept maximal possible, accounting for the limitation conditions of converter's phase currents $I_{inst} = P_1$. In other cases the device for limitting current does not affect the function of above described systems for the control of machines.

Figure 20B:
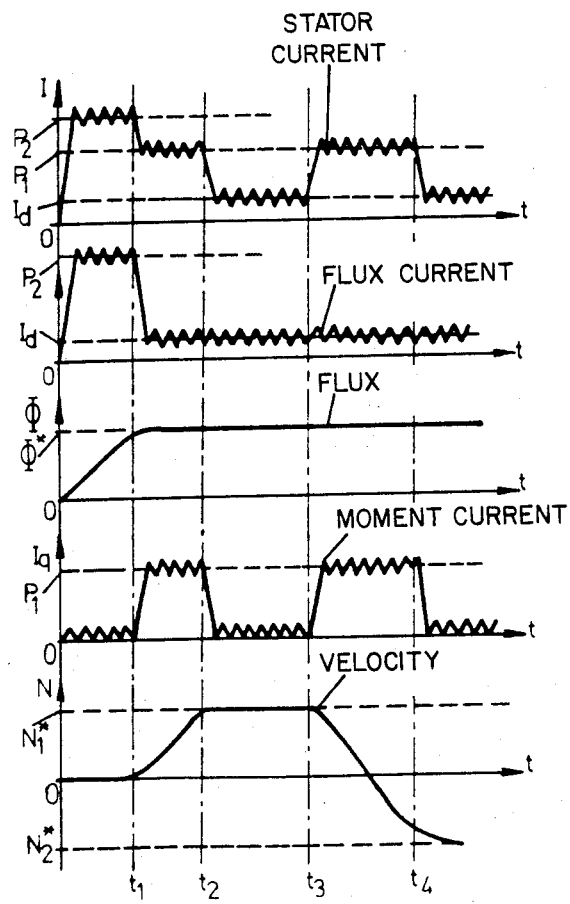

FIG. 20b represents the diagrams of starting a non-magnetized machine and reversing it using the system for the control of angular velocity of rotor's rotation, which explain the function of the device for limitting phase current of the converter supplying machine. It is supposed that the set value of machine rotor flux is constant $\Phi^* = $const, load torque is not applied $M_L = 0$, and the set value velocity of rotation $N^*$ undergoes a step change at the moment $t = t_3$. During the starting time interval $O \div t_1$ converter's phase current is limited at the level of $P_2$, machine's rotor flux rising at the maximum possible speed with the set current limit. At the moment $t = t_1$ sliding mode is established on the structure sliding surface $S_1 = 0$, starting then, rotor flux varies exponentially, in accordance with the sliding mode equation (3). In the interval $t_1 \div t_2$ converter's phase current is limited at the level of $P_1$, rotor's angular velocity of rotation N changing at the maximum possible speed. At the moment $t = t_2$ sliding mode is established on the sliding surface of the structure $S_2 = 0$; starting then, rotor's angular velocity varies exponentially in accordance with the sliding motion equations (3). When the set value of rotor's angular velocity $N^*$ undergoes a step change (reverse command), at the moment $t = t_3$, further processes are analogous to the processes of rising and stabilization of angular velocity in intervals $t_1 \div t_2$, $t_2 \div t_3$.

Figure 21:
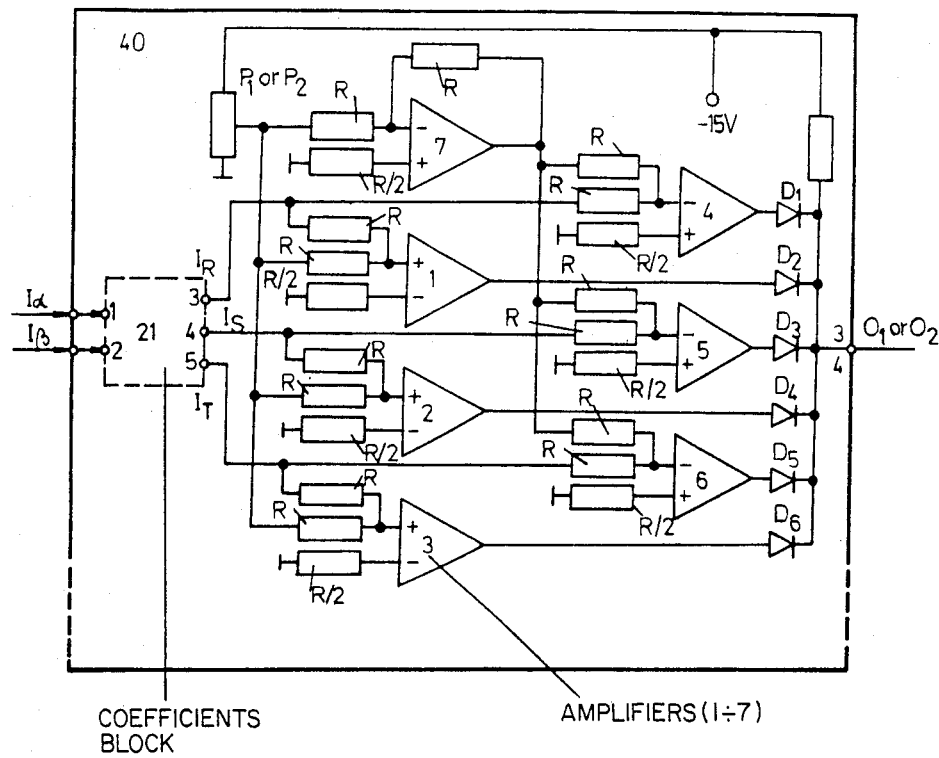
FIG. 21—a more detailed scheme of a part of the device represented in FIG. 19

FIG. 21 represents a more detailed block-diagram of block 40, which is proposed by this invention, and which is represented in FIG. 19. Block 40 consists of: block 21 which forms projections of machine's vector current (set and measured values) on the unit vectors $e_R$, $e_S$, $e_T$, of machine's phases—the current of phases $I_R$, $I_S$, $I_T$ of the converter; two equal electronic schemes which consist of the amplifiers $1 \div 7$, and diodes $D1 \div D6$, each of which forms relay signals $O_1$ and $O_2$ for controlling switches $K_2$ and $K_1$ of block 33 of the device for limiting current, represented in FIG. 19. Amplifiers $1 \div 6$ are comparators which compare the quantities $I_R$, $I_S$, $I_T$ of the converter's phase currents, with levels of $\pm P_1$ or $\pm P_2$, which are set by potentiometers, and the inverting amplifier 7; diodes $D1 \div D6$ are connected by the scheme for selecting maximum signal at the output of amplifiers-comparators $1 \div 6$.

It was noticed earlier, that, for establishing sliding mode on the structure sliding surfaces $S_1 = 0$, $S_2 = 0$ in a control system with an inner contour by machine's stator current (represented in FIG. 2), it is enough to select components $dI_d{}^*/dt$, and $dI_q{}^*/dt$ from the set of two possible values, both components fulfilling conditions (10), (11). Functions $f_1{}^3$ and $f_2{}^3$, which are included in equations (9) and inequalities (11), become equal to zero in the steady state of machine's operation, with angular velocity of rotor N, and load torque $M_L$, constant. This follows especially from the fact that components of stator current $I_d^*$ and $I_q^*$ are constant in the steady state. Thus, to secure the conditions of sliding mode existence (11), it is sufficient, in this case, to select components $dI_d^*/dt$ and $dI_q^*/dt$ from a set of arbitrary, small values. On the other side, in transient dynamical regimes of operation, functions $f_1^3$ and $f_2^3$ rise, and, to satisfy the conditions of sliding mode existence, it is necessary to select components $dI_d^*/dt$ to be sufficiently large in absolute value. So appears a possibility of varying the values of components of derivatives of asynchronous machine's stator current, in dependance on the regime of operation of machine's control system. The desirability of such variation is obvious from the fact that with a definite, and in a general case, fixed effective frequency of switching over the elements which determine the selection of control system's structure, the amplitude of deviation of machine's stator currents components $I_d^*$ and $I_q^*$ is proportional to the values of interruptions of corresponding components of current derivatives $dI_d^*/dt$ and $dI_q^*/dt$. Shortening the amplitude of deviation of currents components to the minimal possible values, enables enlarging the operative precision of control system, because the conditions of operation of the inner contour by stator current of asynchronous machine, are made easier.

Figure 22:
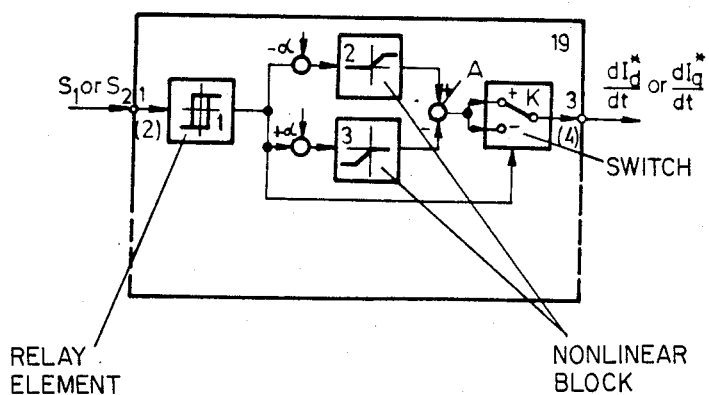
FIG. 22—a more detailed block-diagram of a part of the device represented in FIG. 10

FIG. 22 represents a block-scheme of block 19 for automatic setting the values of discontinuities of derivatives of machine's stator current's components, according to the invention. Block 19 for automatic setting the values, consists of: relay element 1 with hysteresis, which forms the sign of structure switchover function $S_1$ or $S_2$; two integrator elements 2 and 3, both with two-side limitation, the lower level of limitation of integrator 2, and the upper level of integrator 3 equaling zero, while the upper level of integrator 2, and the lower level of integrator 3 equal to the maximum value of derivatives of stator current components with which the operation of the inner contour by stator current is possible; to the inputs of integrators 2 and 3 is fed the sum of output signals of relay element 1, and constant signals + and − respectively. The difference between the output signals of integrators 2 and 3 is fed to the inverting and non-inverting input of the switch controlled by the output signal of relay element 1; the output signal of switch K is also the output signal of b.19. In that way the output signal of block 19 is Asgn $s_i$ i=1,2 where A is the difference between the output signals of integrators 2 and 3, which determines the value of discontinuities of derivatives of machine's stator current components. In sliding mode quantity, A is set automatically so (in the range of set limitations of integrators 2 and 3), that the mean time value of output signal of relay element 1 is constant and equal $+\alpha$, or $-\alpha$. Time constant T of integrators 2 and 3 determine the speed of automatical setting the quantities A, and are to be selected in relation to the realized frequency f of sign change of output element 1, namely T 1/r.

Figure 23:
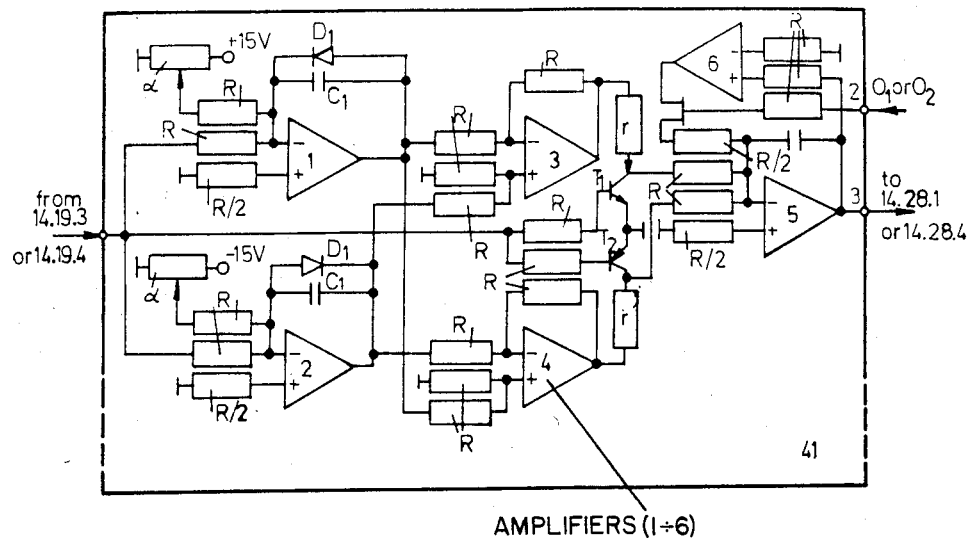
FIG. 23—a more detailed scheme of the devices represented in FIGS. 10 and 22

FIG. 23 represents a more detailed block-scheme of the device 41 for automatical setting the values of discontinuities of derivatives of stator current components, represented in FIG. 22, and the device for limitting stator current represented in FIG. 19. The device 41 consists of: two integrator elements with limitation, realized on amplifiers 1 and 2, for polarity limitation of output signals of the amplifier being used diodes $D_1$ and $D_2$, which are connected in a feedback circuit of amplifier; the limit of value of output signal is reached because of natural limits of amplifier's voltage; to the inputs of amplifier 1 and 2 s fed the sum of relay signals sgn $S_1$, or sgn $S_2$, and the quantities $\alpha$ and $-\alpha$; two summators of output signals of integrators 2 and 3, realized on amplifiers 3 and 4, the output signal of the summator 3 being positive, and its value being equal to negative output signal of summator 4; a switch, realized on transistors $T_1$ and $T_2$, which connects the input of integrator 5 to the outputs of summator 3 or 4, and which is controlled by the output signal sgn $S_1$, or sgn $S_2$ from device 41; integrator 5, which is closed in a feedback circuit via relay elements 6, and which forms the sign of output signal of integrator 5; and a switch realized via FET transistor $T_3$, and controlled by a signal of current limit $O_1$ and $O_2$. The output signal of integrator 5 is component $I_d^*$, or $I_q^*$ of the set machine's stator current, and is fed to the device for transforming the coordinates 28 of block 14 which forms the set stator current $I_\alpha^*$ and $I_\beta^*$ in a stationary coordinate system.

It should be noticed that in many cases of asynchronous machine control, it is sufficient to keep rotor flux constant, or slowly varying during the time of control system's functioning, and flux regulating contour will not have to fulfil any strict conditions for the quality of following the given value of rotor flux $\Phi^*$. In machine in control system represented in FIG. 2, can be simplified. Simplification of the scheme means forming stator current component $I_d^*$, which determines rotor flux, this way:

$$I_d^* = \frac{1}{L_h} \cdot \Phi_d - K(\Phi - \Phi^*)$$

where $\Phi_d$ is as machine's rotor flux modulus (in coordinate system (d,q) which is connected to rotor flux, $\Phi = (\Phi_d, 0)$; K is a constant coefficient. With (18) in, differential equations of as machine rotor flux becomes $$\frac{d\Phi}{dt} = -\frac{2\sqrt{\Phi} R_r \cdot L_h}{L_r} K(\Phi - \Phi^*) \tag{19}$$

If the difference $\Phi - \Phi^*$ is small, or, more precisely, if $(\Phi - \Phi^*)/\Phi << 1$, the coefficient before the difference between the measured and set rotor flux value on the right of equation (19) changes insignificantly, and can be considered constant. The law of variation of the measured rotor flux value, will be near the exponential one with time constant $L_r/2\Phi^* R_r L_h K$. It is worth noticing that, with the difference between the measured and set flux value large enough, the as machine's stator current's component $I_d^*$ will be limitted through the function of the device for current limitting; thus, the law for forming component $I_d^*$ will be (18) applicable just for small values of the difference between the measured and set flux value.

Figure 24:
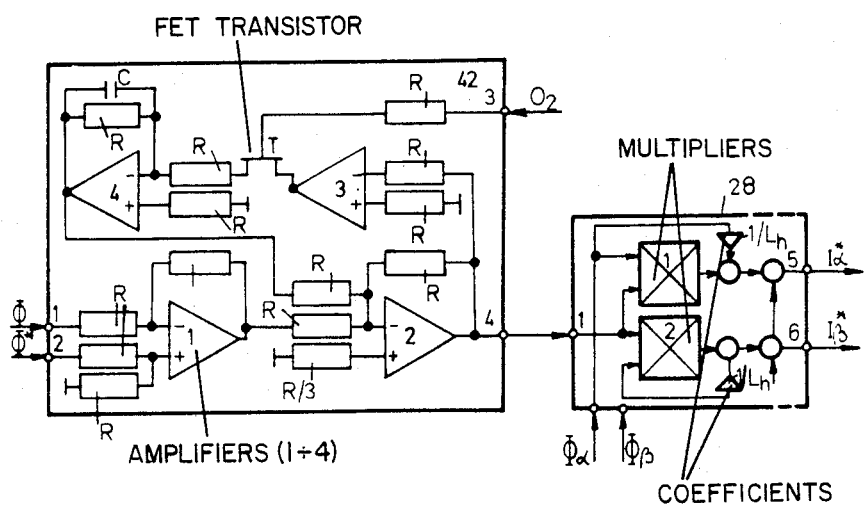
FIG. 24—a more detailed block-diagram of the other part of the device represented in FIG. 10

A block-scheme of a simplified device for rotor flux control, which is realised in the above described control system, is represented in FIG. 24. That simplified device consists of: block 42, which forms a signal proportional to difference $\Phi - \Phi^*$, or signal which is sufficient for fulfilling the condition for current limitting $I_{inst} = P_2$;

output signal of block 42 is fed to the inputs of multipliers 1 and 2, which are included in block 23 of device 14 for forming the set current value, represented in FIG. 10; machine's stator current's component which is proportional to rotor flux (second term on the right of (18), is formed by summing up the components $\Phi_\alpha$ and $\Phi_\beta$, with output signals of multipliers 1 and 2 of block 28. Block 42 consists of: multipliers 1 and 2 forming a signal proportional to the difference between the measured and set rotor flux value, amplifier 2 being included in dynamic circuit with feedback, which consists of comparator 3, a switch realized via FET transistor T, and regulated by the relay output signal $O_2$ of the device for current limiting, represented in FIG. 21, and an inertial block realized on amplifier 4. The time constant T of inertial block 4 is selected by the effective working frequency of $f_1$ which switch over the structure of control system T 1/r.

It was assumed earlier that systems for controlling machine, which are taught in this invention, and represented in FIGS. 1 and 2, contain blocks 4, 5, 6, 7, 8, 9, 10 for obtaining information on torque H, angular position of rotor $\theta$ angular velocity of rotor N, angular acceleration $\epsilon$, magnetic flux of rotor $\Phi$, time derivative of rotor flux value E, and rotor flux components $\Phi_\alpha$ and $\Phi_\beta$.

Consider now, in more detail, blocks of information $4 \div 10$ in the cases when they are, in fact, blocks for computing corresponding quantities. The problem of computing the quantities necessary for synthesis of machine control system was already mentioned when the device for limiting machine stator current was explained. For instance the device for stator current limiting, represented in FIG. 19, contained block 39 which forms the quantity $M' = I_\alpha \Phi_\beta - I_\beta \Phi_\alpha$ proportional (with proportionality coefficient $(L_h/L_r)$ to the torque M of machine, and quantity V' which equals the scaler product of rotor flux vector $\Phi$, and stator current I of machine $V' = I_\alpha \Phi_\beta + I_\beta \Phi_\alpha$.

Figure 25:
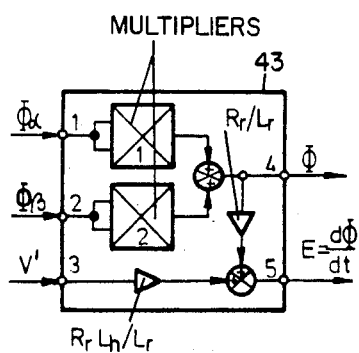
FIG. 25—a more detailed block-diagram of the other part of the devices, represented in FIGS. 1 and 2

FIG. 25 represents a block-scheme of block 43 which forms the square of rotor flux modulus $\Phi$, and the quantity of its time derivative E. Block 43 consists of two multipliers 1 and 2 which form the squares of components $\Phi_\alpha^2$ and $\Phi_\beta^2$ of rotor flux vector, and two summators. The sum of output signals of multipliers 1 and 2 of block 43 is the square of rotor flux modulus $\Phi$; the sum of quantity $\Phi$ and quantity V' which is calculated in block 39 of the device for current limiting represented in FIG. 19, is time derivative E of the quantity $\Phi$. In thise cases the sumation coefficients equal $-(R_r/L_r)$ and $R_r(L_h/L_r)$ respectively, and are determined by the parameters of asynchronous machine employed. The operation of block 43 is based on the differential equation of machine rotor circuit:

$$E = \frac{d\Phi}{dt} = -\frac{R_r}{L_r}\Phi + \frac{R_r L_h}{L_r}(I_\alpha \Phi_\alpha + I_\beta \Phi_\beta) \quad (20)$$

Components $\Phi_\alpha$ and $\Phi_\beta$ of rotor flux can be calculated using the model of machine rotor circuit. Differential equations of rotor circuit, written down in relation to the rotor flux components $\Phi_\alpha$ and $\Phi_\beta$ in a stationary coordinate system have the form $$\frac{d\Phi_\alpha}{dt} = -\frac{R_r}{L_r}\Phi_\alpha + \frac{R_r L_h}{L_r} I_\alpha + P \quad (21)$$

-continued
$$\frac{d\Phi_\beta}{dt} = -\frac{R_r}{L_r}\Phi_\beta + \frac{R_r L_h}{L_r} I_\beta + Q \quad (22)$$

$$P = N\Phi_\beta$$

$$Q = N\Phi_\alpha$$

In that way, on the basis of the known (e.g. measured): angular velocity of rotor N, and stator current components $I_\alpha$ and $I_\beta$, one can calculate components $\Phi_\alpha$ and $\Phi_\beta$ of machine rotor flux.

Figure 26:
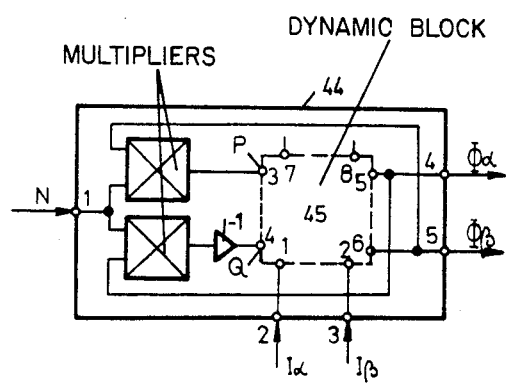
FIG. 26—a detailed block-diagram of the other part of the devices represented in FIGS. 1 and 2

A block-scheme of device 44 for calculating components $\Phi_\alpha$ and $\Phi_\beta$ of rotor flux, is represented in FIG. 26. The device 44 consists of: two multipliers 1 and 2, which form quantities P and Q: block 45, which realises the dynamic connections of equations (21).

Figure 27:
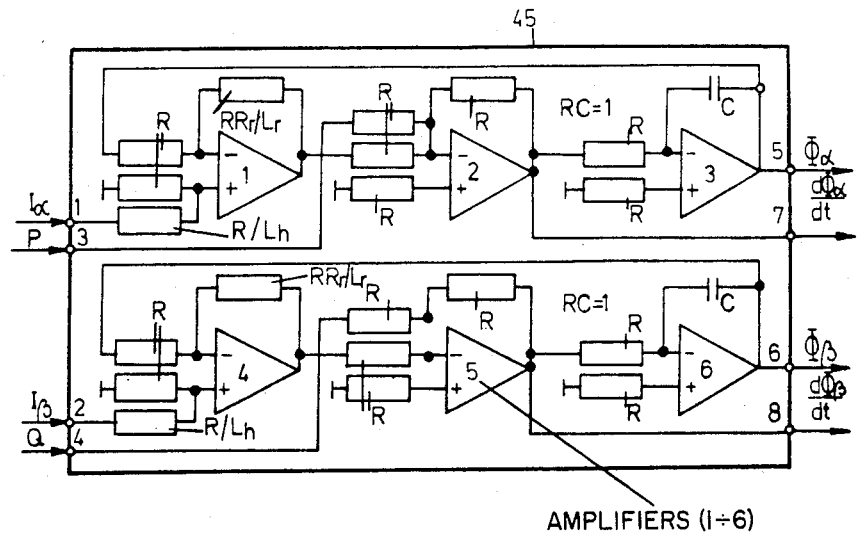
FIG. 27—a more detailed scheme of the part of the device represented in FIG. 26
Figure 28:
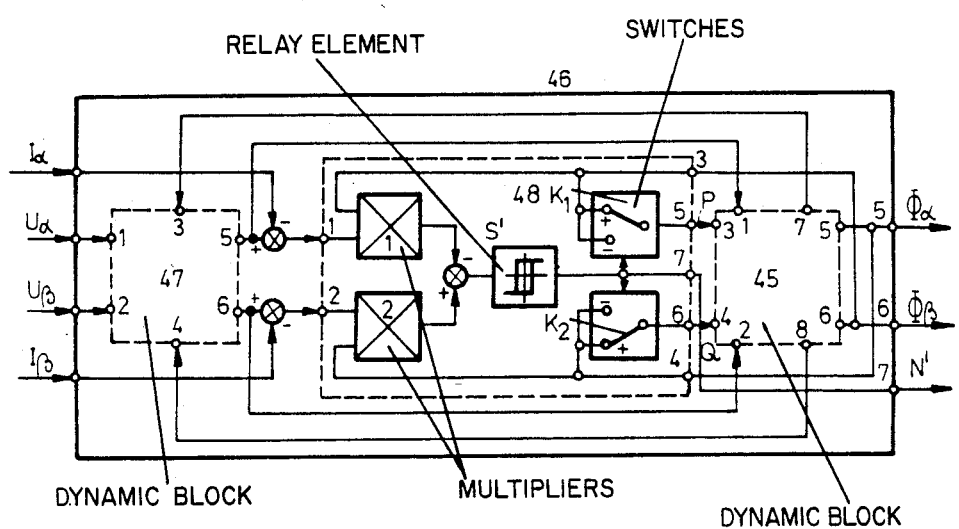
FIG. 28—a more detailed block-diagram of another part of the devices represented in FIGS. 1 and 2

FIG. 27 represents a more elaborate scheme of block 45 which is included in block 44 for calculating machine rotor flux components $\Phi_\alpha$ and $\Phi_\beta$. Block 45 consists of: amplifiers $1 \div 6$, which realize the first (amplifiers $1 \div 3$), and second (amplifiers $4 \div 6$) differential equation of the system (21). For the realization of the device for calculating rotor flux components $\Phi_\alpha$ and $\Phi_\beta$, which is represented in FIG. 25, the information on angular velocity N is needed. If the application of a transducer measuring rotor's angular velocity is not wanted, there can be used the device for calculating components $\Phi_\alpha$ and $\Phi_\beta$ of rotor flux, and the velocity of rotation of rotor N, on the grounds of known (measured) components $I_\alpha$ and $I_\beta$ of stator current, and components $U_\alpha$ and $U_\beta$ of machine supply voltage, which is represented in FIG. 28. The function of device 46 for calculating the components $\Phi_\alpha$ and $\Phi_\beta$ of rotor flux and the velocity of rotor's rotation N, is grounded on bringing sliding mode into the system consisting of an asynchronous machine, and the models of rotor and stator circuits of machien. The stator circuit is described by differential equations $$\frac{dI_\alpha}{dt} = \frac{1}{\sigma L_S}\left(-\frac{L_h}{L_r}\frac{d\Phi_\alpha}{dt} - R_S I_\alpha - U_\alpha\right) \quad (23)$$

$$\frac{dI_\beta}{dt} = \frac{1}{\sigma L_S}\left(-\frac{L_h}{L_r}\frac{d\Phi_\beta}{dt} - R_S I_\beta - U_\beta\right)$$

Differential equations of machine rotor circuit (21) were stated before. The device 46 consists of block 5 modelling machine rotor circuit, reprsented in FIG. 27; block 47 modelling machine's stator circuit, to whose inputs are fed components $U_\alpha$ and $U_\beta$ of machine voltage vector; block 48 consisting of multipliers 1 and 2, whose inputs are the differences between model (outputs of block 47), and measured values of stator current components, and components of machine's rotor flux (output signals of block 45); a relay element whose input is quantity S—the difference between output signals of multipliers 1 and 2; switches $K_1$ and $K_2$, to whose inverting inputs are fed output signals of the model of rotor circuit 45, that is components $\Phi_\alpha$ and $\Phi_\beta$ of machine rotor flux; output signals P and Q of switches $K_1$ and $K_2$ are fed to the inputs of rotor circuit model 45; output signal of device 46 are components $\Phi_\alpha$ and $\Phi_\beta$ of as machine rotor flux which is calculated in block 45, and output signal of the relay element N', which contains the informationon on the velocity of rotation of machine.

Figure 29:
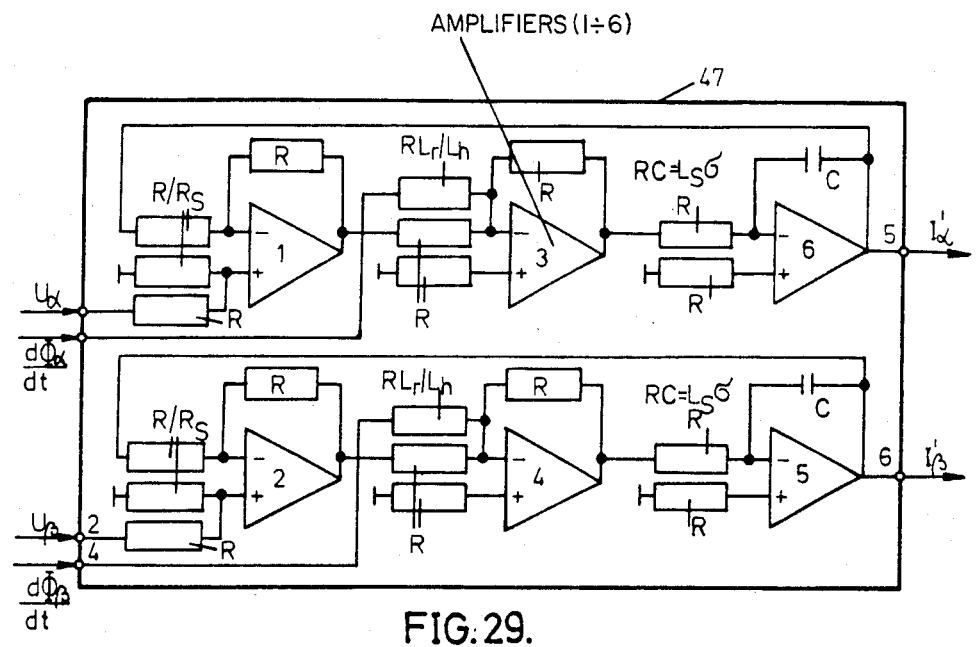
FIG. 29—a more detailed scheme of a part of the suggested device represented in FIG. 28

A more detailed scheme of block 47, which models the machine stator circuit is represented in FIG. 29. The structure of block 47 is in accordance with differential equations of stator circuit (23), and is identical to the structure of block 45, of the model of machine rotor circuit.

Quantity S is formed in block 46 for computing components $\Phi_\alpha$ and $\Phi_\beta$ of the flux and velocity of rotation of rotor N. represented in FIG. 28, in the form $$S = \Delta I_\alpha \Phi_\beta - \Delta I_\beta \Phi_\alpha \qquad (24)$$

where $\Delta I_\alpha$ and $\Delta I_\beta$ is the difference between the calculated (in block 47) and measured components of machine stator current in a stationary coordinate system; $\Phi_\alpha$ and $\Phi_\beta$ are output signals of block 45. Differentiating by time equation (24), and using the known differential equations of the models of rotor (21) and stator (22) circuit of machine, one can obtain $$\frac{ds}{dt} = f_1^6 + (N - sgnS) K_1^6 \cdot \Phi \qquad (25)$$

where $f_1^6$ is a continuous function, $K_1^6$—a constant coefficient determined by the parameters of machine applied. To obtain equation (25) there were used the connections between the input signals P and Q of the block, and output signal sign S of relay element and switches $K_1$ and $K_2$ of block 48, included in block 46.

It follows from equation (25) that, with the condition $$K_1^6 \Phi < |f_1^6 + NK_1^6 \Phi| \qquad (26)$$

satisfied, sliding mode is possible in the structure switchover area $S=0$. Sliding mode established, components of stator current and rotor flux, which are calculated in blocks 47 and 45 included in blck 46, tend torwards measured values, function $f_1^6$ tends towards zero, output signal $N' = sgn\ S$ of relay element equals measured value of velocity of rotor's rotation (with a precision determined by high frequency component).

Information on velocity of rotor's rotation N can be obtained using a filter which selects the mean component of output signal N'. Analog filter can be used for getting the information on the velocity of rotor's rotation N, when pulse generator of velocity, or a techno-generator is used. When adequate differentiating filter is used, the information on angular acceleration of machine's rotor can be obtained. Nevertheless, real filter application significantly deforms the information on angular velocity, and angular acceleration of rotor in the range of high frequency components of the spectrum. This fact makes the synthesis of very fast systems for machines control more difficult, by resulting in, for instance, the loss of stability of the control system by the high values of gain of corresponding regulators. At the same time, for the synthesis of the above-described machine's control systems, represented in FIGS. 1 and 2, the pieces of information on angular velocity and angular acceleration of rotor must be of a quality high enough, as the dynamic non-idealness of different kinds, which are not accounted in the employed mathematical model of system's process, before all filter slowness, can result in unpermissible drop of working frequency of relay and switching elements which determine the structure of control system.

Figure 30A:
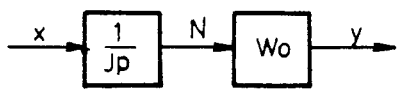
FIGS. 30a and 30b—a block-diagram of the device for correction

Applying a method of parallel correction is suggested for the compensation of dynamical non-idealness of devices for filtering and differentiating. To illustrate this method, FIG. 30a represents a part of structural scheme of machine, which correspond to the mechanical time constant of the rotor—the reduced inertial torque J of machine rotor load—and the desired (from the point of synthesis of control system) "ideal" transfer function of filter $W_o$ (which, maybe, cannot be realized). The output coordinate y of the filter can be for instance velocity of rotation, then $W_o = 1$, or angular acceleration of rotor, then $W_o = p$.

Figure 30B:
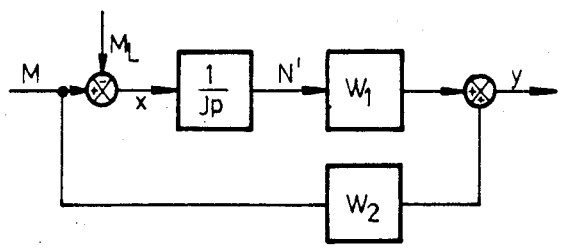

FIG. 30 represents the same part of structural scheme with a filter which can be realized and whose transfer function is denoted by W1. Besides the demand on the physical realizability, filter transfer function W1 can be put on additional conditions, as a result of particularity of the elements applied in control system. For instance, if the velocity of rotation of machine's rotor N is measured by a pulse generator of velocity, or if it is contained in the information on the mean value of output signal of relay element, which is obtained by the device 46 for calculating components of rotor flux, and velocity of machine's rotation, represented in FIG. 28, then filter W1 should filter the pulse of output signal separating the mean component of output signal; thus the difference between the powers of denomination and numerator polynomial of transfer function W1 should be at least 1. To compensate the existing dynamical non-idealness, application of the filter with transfer function W2, which physically can be realized, is suggested, and to its input is fed the difference between the electrical torque M, and load torque $M_L$ of as machine. If conditions of componsating dynamical non-idealness are fulfilled $$W_2(p) = \frac{W_o(p) - W_1(p)}{Jp} \qquad (27)$$

the total transfer function of the circuit, the function represented in FIG. 30b, coincides with the ideal transfer function of the circuit, the function represented in FIG. 30a. The output signals of the above mentioned circuits will coincide, with a precision up to, maybe, damping component of the transient, which can appear because of the different initial conditions of output signals of the filters.

If load torque $M_L$ of the machine is not being measured, the input of filter W2 can be a signal proportional to the machine's torque M, measured by a transducer, or by the devices for torque calculation described earlier. In that case transfer function W2 should comply with the additional condition $$W_2(p) = \frac{p^m P(p)}{Q(p)} \qquad (28)$$

Satisfying the condition (28) is reached through the adequate selection of transfer function W1, accounting for the condition of the possibility of its physical realization, and the condition of compensating dynamic non-idealness (27). As transfer function W2, defined by the expression (28), complies with the condition of compensating non-idealness (27), and when $m = 1$, filter gain, with transfer function W2 as a constant component of input signal, equals zero, then, obviously both discussed cases of filter W2 use are equivalent, if load torque $M_1$ of the machine is constant, or changes slowly enough.

Figure 31:
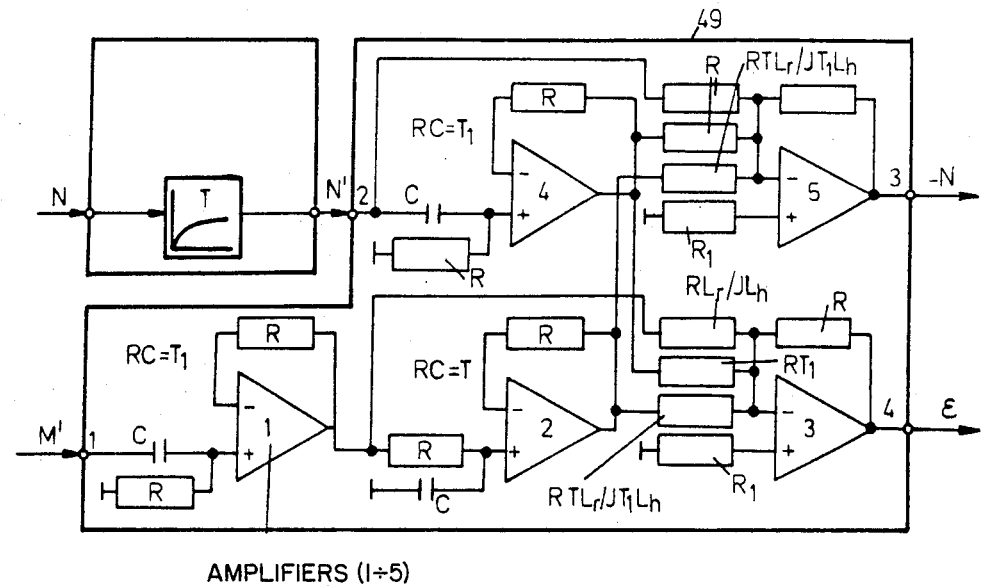
FIG. 31—a more detailed scheme of the device for correction represented in FIG. 30

FIG. 31 represents a circuit for device 49 for calculating rotor's angular velocity N, and angular acceleration ϵ, which employs (49) the method of parallel correction. The input of device (49) is the output signal of velocity filter generator, which has time constant T, and which describes generator's inertness, or the inertial block for filtering high frequency signal of angular velocity transducer (of interferences or high frequency impulses), and the signal proportional to the machine's torque M. The device 49 consists of active filters, realized via amplifiers 1, 2, 4, and summators realized via amplifiers 3, 4, which realize filtering and correction of transfer functions of filters.

Time constants of the filters of the device 49 realized via amplifiers 1 and 4, must equal one another, and time constant of the filter realized via amplifier 2 must be equal to the time constant of T filter, which characterizes the inertness of the transducer, or of the convertor of angular velocity transducer's pulses. The condition of equality of corresponding time constants follows from the condition (27). When realizing the device 49, there can appear the technical difficulties of selecting equal time constants of corresponding filters, and measuring them precisely, which is explained by e.g. significant differences between the values of parameters of capacitors employed.

Figure 32:
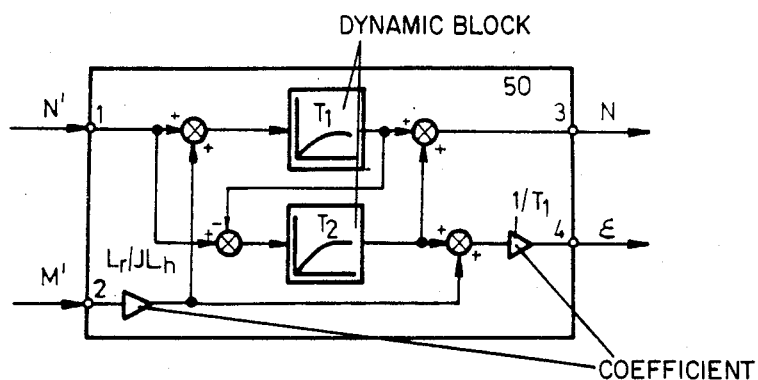
FIG. 32—a more detailed block-diagram of the other device for correction represented in FIG. 30.

FIG. 32 represents a block-scheme of a device 50 for calculating rotor's angular velocity N, and angular acceleration ϵ, which uses the method of parallel correction, which does not require an exact selection of values of filter time constants. The device 50, represented in FIG. 32, consists of: two inertial blocks with time constants $T_1$ and $T_2$, and a summator, while damping, differentiating, and correcting the signals are effectuated by the same filters $T_1$, $T_2$, which explains the freedom in selecting their time constants. The input signals of the device 50, are the direct signals from the transducer of rotor's angular velocity (when pulse generator is applied, the input of device 50 is, for instance, pulse output signal of the device for forming standard length pulses), or output signal of relay element $N' = \text{sgn } S$ of the device 46 for calculating the components of rotor flux, and angular velocity of the rotor, represented in FIG. 28, and signal M', proportional to the torque of machine, which is computed, for instance using block 39 represented in FIG. 19. Output signals of the device 50 are rotor's angular velocity N, and angular acceleration of the machine's rotor.

Although the description in the sugested patent was done through the concrete examples, and according to the concrete realization, it does not exclude amendments and other apparent modifications, which do not change the essence, and which stay within the limits of the given invention.

We claim:

1. A method of controlling an asynchronous machine supplied via a frequency converter comprising:
   sensing the value of rotor flux of said machine and the time derivative thereof;
   providing a set value of rotor flux and of the time derivative thereof;
   producing a first control signal corresponding to a sum of the differences between the sensed and set values of the rotor flux and of their time derivatives;
   sensing the rotor angular position of said machine, and the velocity and acceleration thereof;
   providing set values of rotor angular position, velocity and acceleration;
   providing a second control signal corresponding to a linear combination of differences between the sensed and set values of rotor angular position, velocity and acceleration; and
   forming the supply voltage vector of said asynchronous machine by use of switching circuitry, said voltage vector having a first component which is the scalar product of a vector whose components are of fixed magnitude and have polarity signs equal to the signs of the first and second control signal, respectively, with the rotor flux vector, such relationship being sign functions, and a second component which is the scalar product of the same vector whose components are sign functions of the control signals and the vector orthogonal to the rotor flux vector having the same magnitude as the rotor flux vector.

2. The method of claim 1 wherein the sign of the first component controls the value of the square of the rotor flux amplitude and the sign of the second component controls rotor angular position or velocity or acceleration of the asynchronous machine.

3. The method of claim 1 further comprising the steps:
   sensing the torque being developed by the asynchronous machine;
   providing a set value of torque;
   producing a third control signal corresponding to the difference between the sensed and the set values of torque; and
   forming the supply voltage vector of said asynchronous machine, said voltage vector having a first component which is the scalar product of a vector whose components are sign functions of the said first and third control signal, respectively, with the rotor flux vector, and a second component which is the scalar product of the same vector whose components are sign functions of the control signals and the vector orthogonal to the rotor flux vector having the same magnitude as the rotor flux vector.

4. The method of claim 2 wherein the product of said first control signal and its time derivative is negative in value;
   wherein the product of said second control signal and its time derivative is negative in value; and
   wherein the product of said third control signal and its time derivative is negative in value;
   whereby it is ensured that
   the said first control signal is arbitrary small
   the said second control signal is arbitrary small
   the said third control signal is arbitrary small, such that
   the difference between actual and desired flux value tends to zero with speed which does not depend on the controlled machine parameters and the difference between actual and desired values of position or speed or acceleration or torque tends to zero with speed which does not depend on the controlled machine parameters.

5. Apparatus for controlling the operation of an asynchronous machine comprising:
   converter means connected to a source of electrical power and to said machine for providing excitation to said machine responsive to processed control signals, said processed control signals varying through positive and negative value characterized by positive and negative signs, said source providing a voltage of predetermined magnitude to said machine, said converter means including power switching means coupled between said sorce and said machine for altering the direction of current applied to said machine in response to signs of said processed control signals;

sensor means connected to said machine for sensing and developing a corresponding plurality of actual value signals;

reference value input means adapted to accept a plurality of input reference values corresponding in number and type to said actual values, and to provide corresponding reference value signals;

switchover function means responsive to said actual value signals for producing first and second primary control signals corresponding to linear combinations of predetermined pairs of said signals;

flux transducer means for sensing vector components of the magnetic flux in said machine rotor, and for producing a pair of vector signals corresponding thereto; and control circuit means connected to said conversion means and to said switchover function means and to said flux transducer means for providing said processed control signals responsive to said first and second primary control signals and to said flux vector signals.

6. The apparatus of claim 5 wherein said control circuit further comprises:

a plurality of input relay means responsive to said first and second primary control signals for producing hysteresis modified versions thereof;

a first group of switching means responsive to the hysteresis modified version of said first primary control signals for producing a first signed sum of said flux vector signals, and a second group of switching means responsive to the hysteresis modified version of said second primary control signal for producing a second signed sum of said flux vector signal;

a plurality of coefficient determining means responsive to said first and second signed sums for producing weighted control signals; and a plurality of output relay means responsive to said weighted control signals for producing said processed control signals.

7. The apparatus of claim 6 wherein said plurality of actual values comprise rotor angular position, rotor angular speed, rotor angular acceleration, the magnitude of rotor flux and its first time derivative, and the torque being developed.

8. Apparatus for controlling the operation of an asynchronous machine, comprising:

converter means connected to a source of electrical power and to said machine for providing excitation to said machine, said converter means including power switching means coupled between said source and said machine for altering the direction of current applied to said machine in response to signs of processed control signals said processed control signals varying through positive and negative values characterized by positive and negative signs, said source providing a voltage of predetermined magnitude to said machine;

sensing means connected to said machine for sensing and developing a corresponding plurality of actual value signals;

reference value input means adapted to accept a plurality of input reference values corresponding in number and type to said actual values, and to provide corresponding reference value signals;

switchover function means responsive to said actual value signals for producing first and second primary control signals corresponding to linear combinations of predetermined pairs of said signals;

flux transducer means for sensing vector components of the magnetic flux in said machine rotor, and for producing a pair of vector signals corresponding thereto;

current transducer means for sensing vector components of the stator current in said machine and for producing a pair of orthogonal current vector signals corresponding thereto;

control circuit means connected to said switchover function means for producing reference values of the machine stator current responsive to said first and second primary control signals and to said current vector signals;

first and second summing means connected to said control circuit means and to said current transducer means for producing first and second intermediate control signals corresponding respectively to the difference of the first stator current reference value and of said pair of current vector signals, and to the difference of the second stator current set point value and the other of said pair of current vector signals; and composite control means connected to said inverter and to said summing means for providing said processed control signals.

9. The apparatus of claim 8 wherein a closed control loop is formed for following said first and second stator current reference values, said closed loop comprising:

said first and second summing means;

said current transducer means;

said composite control circuit means; and said converter means.

10. The apparatus of claim 8 wherein said control circuit means further comprises:

first and second input relay elements responsive respectively to said first and second primary control signals for producing hysteresis-modified versions thereof;

first and second integrator elements responsive respectively to the hysteresis-modified versions of said first and second primary control signals for producing corresponding respective integrated versions thereof;

a first group of multiplier means responsive to the integrated and hysteresis-modified version of said first primary control signals for producing a first multiplication of said flux vector signal corresponding to a first atator current reference value, and a second group of multiplier means responsive to the integrated hysteresis-modified version of said second primary control signals for producing a second multiplication of said flux vector signal corresponding to a second stator current reference value; and wherein said composite control circuit means further comprises:

a plurality of coefficient determining means responsive to said intermediate control signals for producing weighted intermediate signals;

a plurality of relay means responsive to said weighted intermediate signals and to integrated feedback signals for producing said processed control signals; and integrator means responsive to the composite sum of said processed control signals for producing said integrated feedback signals.

11. The apparatus of claim 10 wherein said plurality of actual values comprise rotor angular position, rotor angular speed, rotor angular acceleration, the magnitude of rotor flux and its first time derivative, and the torque being developed.

12. The apparatus of claim 7 or 9 wherein said processed control signals provide discontinuous orders to said power switching means within said converter means for providing controlled excitation to the stators of said asynchronous machine.

* * * * *